United States Patent
Guo et al.

(10) Patent No.: US 11,997,491 B2
(45) Date of Patent: May 28, 2024

(54) DATA TRANSMISSION SYSTEM AND METHOD, AND APPARATUS THEREOF

(71) Applicant: Huawei Technologies Co., Ltd., Shenzhen (CN)

(72) Inventors: Longhua Guo, Shanghai (CN); He Li, Shanghai (CN); Jing Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 359 days.

(21) Appl. No.: 17/380,455

(22) Filed: Jul. 20, 2021

(65) Prior Publication Data
US 2021/0352481 A1  Nov. 11, 2021

Related U.S. Application Data

(63) Continuation of application No. PCT/CN2020/072852, filed on Jan. 17, 2020.

(30) Foreign Application Priority Data

Jan. 21, 2019  (CN) .......................... 201910055458.X

(51) Int. Cl.
*H04W 12/104* (2021.01)
*H04W 4/029* (2018.01)

(52) U.S. Cl.
CPC ......... *H04W 12/104* (2021.01); *H04W 4/029* (2018.02)

(58) Field of Classification Search
CPC ... H04W 12/104; H04W 4/029; H04W 12/02; H04W 4/02; H04W 12/106; H04W 12/63; H04W 4/025; H04W 12/10
(Continued)

(56) References Cited

U.S. PATENT DOCUMENTS

| | | | |
|---|---|---|---|
| 10,993,108 B2 * | 4/2021 | Nolan | H04W 12/02 |
| 2011/0190009 A1 * | 8/2011 | Gerber, Jr. | H04W 12/02 455/456.3 |

(Continued)

FOREIGN PATENT DOCUMENTS

| | | | | |
|---|---|---|---|---|
| CN | 1567878 A | | 1/2005 | |
| CN | 107592281 A | * | 1/2018 | ............. H04L 29/06 |
| WO | 2018202284 A1 | | 11/2018 | |

OTHER PUBLICATIONS

3GPP TR 23.731 V0.7.0, "3rd Generation Partnership Project; Technical Specification Group Services and System Aspects; Study on Enhancement to the 5GC LoCation Services (Release 16)," Oct. 2018, 165 pages.

(Continued)

*Primary Examiner* — Jacob Lipman
(74) *Attorney, Agent, or Firm* — Conley Rose, P.C.

(57) ABSTRACT

A data transmission method includes calculating, by a user equipment (UE), a first message authentication code of first location privacy setting data, sending, by the UE, the first message authentication code and the first location privacy setting data to a data management network element, receiving, by the UE, a second message authentication code from the data management network element, calculating, by the UE, a third message authentication code of the first location privacy setting data, determining, by the UE, that the first location privacy setting data is not tampered with when the second message authentication code is the same as the third message authentication code.

20 Claims, 15 Drawing Sheets

(58) Field of Classification Search
USPC .......................................................... 726/23
See application file for complete search history.

(56) References Cited

U.S. PATENT DOCUMENTS

2019/0104134 A1* 4/2019 Lee ........................ H04W 76/10
2019/0141524 A1* 5/2019 Wang .................... H04W 12/02

OTHER PUBLICATIONS

Huawei, et al., "Key Issue for integrity protection of location and assistance data," 3GPP TSG SA WG3 (Security) Meeting #93, S3-183771, Nov. 12-16, 2018, 2 pages.

Vivo, et al., "Solution5 Update: Privacy Check procedure W.R.T. LMF based architecture," SA WG2 Meeting #127, $2-183951, Apr. 16-20, 2018, 3 pages.

Huawei, et al., "Solution on integrity protection of privacy setting between UE and UDM," 3GPP TSG-SA WG3 (Security) Meeting #94, S3-190188, Jan. 28-Feb. 1, 2019, 2 pages.

3GPP TS 38.455 V15.2.1, "3rd Generation Partnership Project; Technical Specification Group Radio Access Network; NG-RAN; NR Positioning Protocol A (NRPPa) (Release 15)," Jan. 2019, 60 pages.

3GPP TS 36.355 V15.2.0, "3rd Generation Partnership Project; Technical Specification Group Radio Access Network; Evolved Universal Terrestrial Radio Access (E-UTRA); LTE Positioning Protocol (LPP) (Release 15)," Dec. 2018, 220 pages.

3GPP TS 23.502 V15.4.1, "3rd Generation Partnership Project; Technical Specification Group Services and System Aspects; Procedures for the 5G System; Stage 2(Release 15)," Jan. 2019, 347 pages.

* cited by examiner

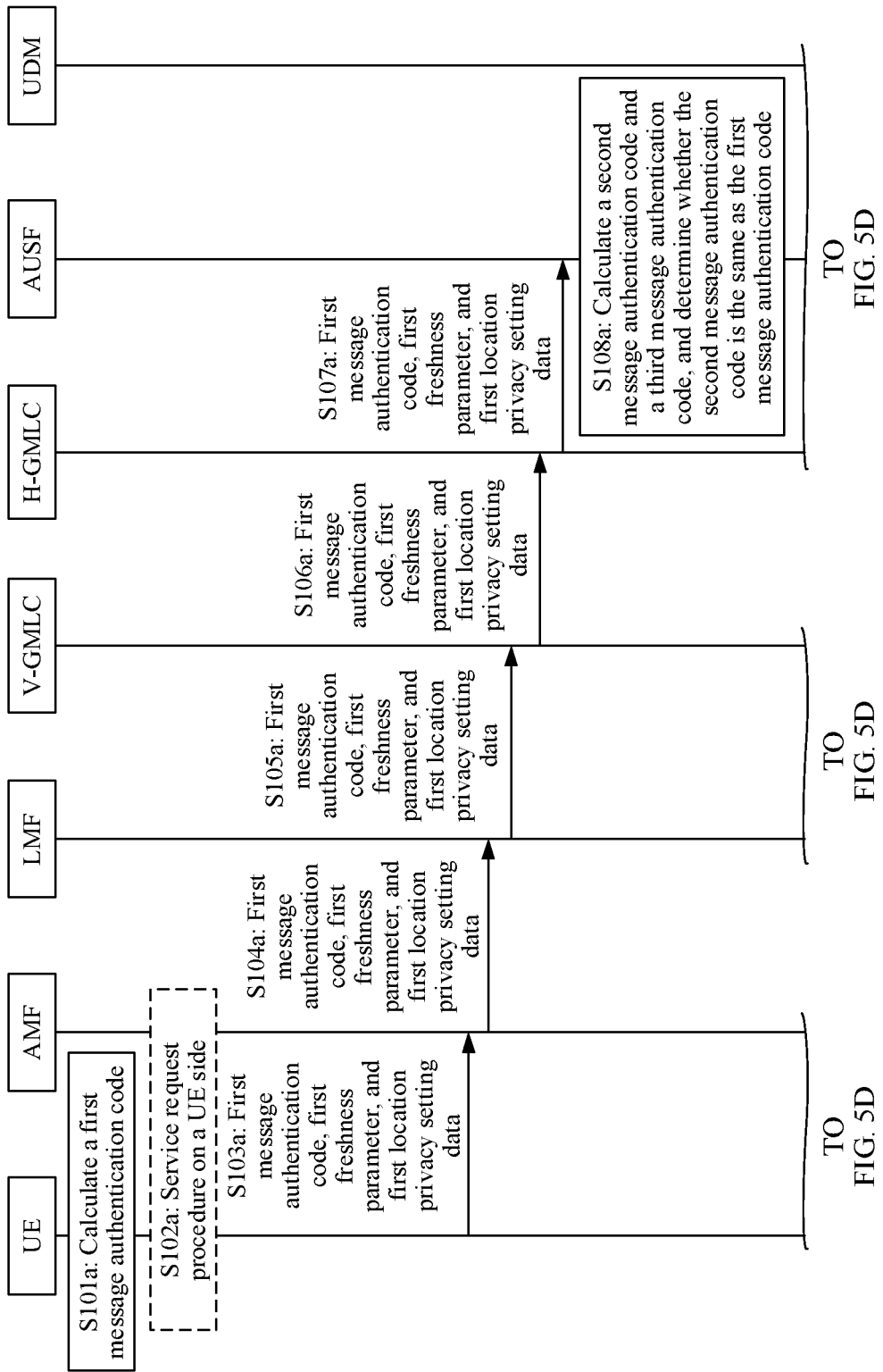

DATA TRANSMISSION SYSTEM AND METHOD, AND APPARATUS THEREOF

CROSS-REFERENCE TO RELATED APPLICATIONS

This application is a continuation of International Patent Application No. PCT/CN2020/072852 filed on Jan. 17, 2020, which claims priority to Chinese Patent Application No. 201910055458.X filed on Jan. 21, 2019. The disclosures of the aforementioned applications are hereby incorporated by reference in their entireties.

TECHNICAL FIELD

This application relates to the field of communications technologies, and in particular, to a data transmission system and method, and an apparatus thereof.

BACKGROUND

With development of communications technologies, a 5th-generation (5G) communications technology emerges. The 5G communications technology can provide a high-precision and low-latency location service, and can enhance protection of user privacy data. For a user terminal that uses a 5G location service, a user may modify a location privacy setting on the user terminal at any time. The location privacy setting includes not allowing positioning (that is, not allowing obtaining location information of user equipment), requiring to notify the user and being authorized by the user to determine whether to allow positioning, allowing positioning but requiring to notify the user, allowing positioning but not requiring to notify the user, and the like.

In a current location privacy setting update procedure, a user equipment (UE) sends a location privacy setting data update request to an access and mobility management function (AMF) network element in a core network by using a radio access network (RAN). The location privacy setting data update request carries updated location privacy setting data. The AMF network element sends the location privacy setting data to a gateway mobile location center (GMLC) function network element. Then, the GMLC network element sends the location privacy setting data to a unified data management (UDM) network element. The UDM network element updates, based on the location privacy setting data, location privacy setting data of the UE, and stores updated location privacy setting data of the UE.

In the foregoing location privacy setting update procedure, the location privacy setting data reported by the UE to the UDM network element passes through the GMLC network element, and there is a risk of maliciously modifying the location privacy setting data by the GMLC network element. However, the UE and the UDM network element cannot perceive whether the location privacy setting data is modified. As a result, the UDM network element stores incorrect location privacy setting data, and consequently, the location privacy setting data between the UE and the UDM network element lacks effective end-to-end integrity protection.

SUMMARY

A technical problem to be resolved in embodiments of this application is to provide a data transmission system and method, and an apparatus thereof, to effectively prevent location privacy setting data from being tampered with, thereby ensuring end-to-end integrity protection of location privacy setting data between a user terminal and a UDM network element.

A first aspect of this embodiment of this application provides a data transmission system, and the system includes a user terminal and a data management network element.

The user terminal is configured to calculate a first message authentication code of first location privacy setting data, and send the first message authentication code and the first location privacy setting data to the data management network element.

The data management network element is configured to receive the first message authentication code and the first location privacy setting data from the user terminal, obtain a second message authentication code of the first location privacy setting data, and if the first message authentication code is the same as the second message authentication code, determine that the first location privacy setting data is not tampered with, and store the first location privacy setting data.

According to the first aspect, the data management network element compares the first message authentication code with the second message authentication code to determine whether the first location privacy setting data is tampered with, to effectively prevent location privacy setting data from being tampered with, thereby ensuring end-to-end integrity protection of the location privacy setting data between the user terminal and the data management network element. When the first location privacy setting data is not tampered with, the first location privacy setting data is stored, so that another network element may obtain the location privacy setting data of the user terminal from the data management network element.

When sending the first message authentication code and the first location privacy setting data to the data management network element, the user terminal may send the first message authentication code and the first location privacy setting data to the data management network element by using an access network element and a core network element. In a possible implementation, the core network element includes an access management network element. In this case, the user terminal may sequentially send the first message authentication code and the first location privacy setting data to the data management network element by using the access network and the access management network element. In another possible implementation, the core network element includes an access management network element and a location management network element. In this case, the user terminal may sequentially send the first message authentication code and the first location privacy setting data to the data management network element by using the access network, the access management network element, and the location management network element. In still another possible implementation, the core network element includes an access management network element, a location management network element, and a gateway mobile location network element. In this case, the user terminal may sequentially send the first message authentication code and the first location privacy setting data to the data management network element by using the access network, the access management network element, the location management network element, and the gateway mobile location network element. The gateway mobile location network element may include a home gateway mobile location network element and a visited gateway mobile location network element. The user terminal may sequentially send the first message authentication code and the first location privacy setting data to the data management network element by using the access network, the access management network element, the location management network element, the visited gateway mobile location network element, and the home gateway mobile location network element.

With reference to the first aspect, in a possible implementation, after the data management network element determines that the first message authentication code is the same as the second message authentication code, the user terminal may perform secondary authentication. The data management network element obtains a third message authentication code of the first location privacy setting data. When determining that the first message authentication code is the same as the second message authentication code, the data management network element sends the third message authentication code to the user terminal. When receiving the third message authentication code, the user terminal calculates a fourth message authentication code of the first location privacy setting data, and determines whether the third message authentication code is the same as the fourth message authentication code. If the third message authentication code is the same as the fourth message authentication code, the data management network element determines that the first location privacy setting data is not tampered with. Twice authentication is performed to further ensure end-to-end integrity protection of the location privacy setting data between the user terminal and the data management network element.

The user terminal may calculate the first message authentication code of the first location privacy setting data based on a first freshness parameter, where the first freshness parameter includes a first counter value and a first function counter value. The user terminal may notify the data management network element of the first freshness parameter, so that the data management network element obtains the second message authentication code of the first location privacy setting data based on the first freshness parameter. The user terminal calculates a fourth message authentication code of the first location privacy setting data based on a second freshness parameter, where second freshness parameter includes a first counter value and a second function counter value, and the second function counter value is different from the value of the first function counter value.

Alternatively, the user terminal calculates the first message authentication code of the first location privacy setting data based on a first random value, and calculates the second message authentication code of the first location privacy setting data based on a second random value. The first random value is generated by the user terminal, and the user terminal may notify the data management network element of the first random value, so that the data management network element obtains the second message authentication code of the first location privacy setting data based on the first random value. The second random value is generated by the data management network element or an authentication service network element, and then the data management network element or the authentication service network element notifies the user terminal of the second random value, so that the user terminal calculates the fourth message authentication code of the first location privacy setting data based on the second random value.

That the data management network element obtains the second message authentication code of the first location privacy setting data may be that the data management network element independently calculates the second message authentication code of the first location privacy setting data, for example, calculates the second message authentication code of the first location privacy setting data based on the first freshness parameter or the first random value. Alternatively, that the data management network element obtains the second message authentication code of the first location privacy setting data may be that the data management network element may obtain the second message authentication code of the first location privacy setting data from the authentication service network element. For example, the data management network element notifies the authentication service network element of the first freshness parameter, and then the authentication service network element calculates the second message authentication code of the first location privacy setting data based on the first freshness parameter, and notifies the data management network element of the second message authentication code.

With reference to the first aspect, in a possible implementation, the user terminal is further configured to send the first freshness parameter to the data management network element, where the first freshness parameter, the first message authentication code, and the first location privacy setting data may be carried in a same message. The user terminal notifies the data management network element of the first freshness parameter, so that the data management network element notifies the authentication service network element of the first freshness parameter, and the authentication service network element calculates the second message authentication code of the first location privacy setting data based on the first freshness parameter.

With reference to the first aspect, in a possible implementation, the data transmission system further includes an access management network element and a gateway mobile location network element.

The gateway mobile location network element is configured to send a location service request to the access management network element.

The access management network element is configured to receive the location service request from the gateway mobile location network element, and send a location privacy setting data obtaining request to the data management network element, receive a location privacy setting data obtaining response from the data management network element, where the location privacy setting data obtaining response includes the first location privacy setting data, and perform a location service operation based on the first location privacy setting data.

The access management network element obtains the first location privacy setting data from the data management network element and performs the location service operation based on the first location privacy setting data, so that the gateway mobile location network element can be prevented from delivering, to the access management network element, action indication information that does not match the first location privacy setting data, thereby effectively protecting location information of the user terminal.

With reference to the first aspect, in a possible implementation, when performing the location service operation based on the first location privacy setting data, the access management network element is further configured to, if the first location privacy setting data is allowing positioning but requiring to notify a user, send a notification message to the user terminal, and request to obtain location information of the user terminal, if the first location privacy setting data is allowing positioning but not requiring to notify a user, request to obtain location information of the user terminal, or if the first location privacy setting data is requiring to notify a user and being authorized by the user to determine whether to allow positioning, send a notification message to the user terminal, and when receiving a location permission message from the user terminal, request to obtain location information of the user terminal.

With reference to the first aspect, in a possible implementation, the location privacy setting data obtaining response further includes first indication information, and the first indication information is used to indicate that the first location privacy setting data is requested by the access management network element for the first time. Before being configured to perform the location service operation based on the first location privacy setting data, the access management network element is further configured to obtain second location privacy setting data from the user terminal based on the first indication information, and if the second location privacy setting data is the same as the first location privacy setting data, perform an operation of performing the location service operation based on the first location privacy setting data.

When receiving the first indication information, the access management network element obtains the second location privacy setting data from the user terminal, to determine whether location privacy setting data, of the user terminal, stored in the data management network element is latest location privacy setting data.

With reference to the first aspect, in a possible implementation, the access management network element is further configured to, if the second location privacy setting data is different from the first location privacy setting data, perform a location service operation based on the second location privacy setting data, that is, perform a corresponding location service operation based on the latest location privacy setting data, and send the second location privacy setting data to the data management network element. The data management network element is further configured to receive the second location privacy setting data from the access management network element, and update the stored location privacy setting data of the user terminal from the first location privacy setting data to the second location privacy setting data, so that the data management network element stores the latest location privacy setting data.

With reference to the first aspect, in a possible implementation, the location service request delivered by the gateway mobile location network element includes action indication information, and the action indication information is used to indicate the location service operation. When receiving the action indication information, the access management network element verifies whether the action indication information matches the first location privacy setting data. If the action indication information matches the first location privacy setting data, the access management network element determines that the gateway mobile location network element does not tamper with the first location privacy setting data. If the action indication information does not match the first location privacy setting data, the access management network element determines that the gateway mobile location network element tampers with the first location privacy setting data. In this case, the access management network element may report an error reason that the gateway mobile location network element tampers with the first location privacy setting data.

With reference to the first aspect, in a possible implementation, the data transmission system further includes an access management network element and a gateway mobile location network element.

The gateway mobile location network element is configured to send a location privacy setting data obtaining request to the data management network element, where the location privacy setting data obtaining request includes a third freshness parameter, and the third freshness parameter includes a third counter value and a third function counter value.

The data management network element is further configured to receive the location privacy setting data obtaining request from the gateway mobile location network element, perform digital signing on the first location privacy setting data based on the third freshness parameter, to obtain digital signature data, and send a location privacy setting data obtaining response to the gateway mobile location network element, where the location privacy setting data obtaining response includes the first location privacy setting data, the digital signature data, and the third freshness parameter.

The gateway mobile location network element is further configured to send a location service request to the access management network element, where the location service request includes action indication information, digital signature data, and a third freshness parameter, and the action indication information is used to indicate a location service operation.

The access management network element is configured to receive the location service request from the gateway mobile location network element, and check, based on a public key of the data management network element, whether the digital signature data matches the action indication information. If the digital signature data matches the action indication information, the access management network element determines that the gateway mobile location network element does not tamper with the first location privacy setting data. If the digital signature data does not match the action indication information, the access management network element executes the location service operation based on the first location privacy setting data obtained by designing the digital signature data.

The data management network element performs digital signing on the first location privacy setting data, to prevent the gateway mobile location network element from delivering action indication information that does not match the first location privacy setting data, thereby effectively protecting the location information of the user terminal.

A second aspect of this embodiment of this application provides a data transmission method, including the following.

A user terminal calculates a first message authentication code of first location privacy setting data.

The user terminal sends the first message authentication code and the first location privacy setting data to a data management network element.

According to the second aspect, the user terminal sends the first message authentication code and the first location privacy setting data to the data management network element, so that the data management network element compares the first message authentication code with the obtained second message authentication code to determine whether the first location privacy setting data is tampered with, to effectively prevent location privacy setting data from being tampered with, thereby ensuring end-to-end integrity protection of the location privacy setting data between the user terminal and the data management network element.

With reference to the second aspect, in a possible implementation, the user terminal calculates the first message authentication code of the first location privacy setting data based on a first freshness parameter, where the first freshness parameter includes a first counter value and a first function counter value. Alternatively, the user terminal calculates the first message authentication code of first location privacy setting data based on a first random value.

With reference to the second aspect, in a possible implementation, the user terminal further sends the first freshness parameter to the data management network element, so that the data management network element obtains the second message authentication code.

With reference to the second aspect, in a possible implementation, the user terminal receives a third message authentication code from the data management network element, and calculates a fourth message authentication code of the first location privacy setting data. If the third message authentication code is the same as the fourth message authentication code, the user terminal determines that the first location privacy setting data is not tampered with. The user terminal performs secondary authentication to further ensure end-to-end integrity protection of the location privacy setting data between the user terminal and the data management network element.

With reference to the second aspect, in a possible implementation, the user terminal calculates the fourth message authentication code of the first location privacy setting data based on a second freshness parameter, where the second freshness parameter includes a first counter value and/or a second function counter value, and the second function counter value is different from the first function counter value. The first function counter value is for the user terminal, and the second function counter value is for an authentication service network element or the data management network element.

Alternatively, the user terminal calculates the fourth message authentication code of the first location privacy setting data based on a second random value, where the second random value is generated by the data management network element or an authentication service network element, and may be sent to the user terminal together with the third message authentication code.

A third aspect of this embodiment of this application provides a user terminal. The user terminal has a function of implementing the method provided in the second aspect. The function may be implemented by hardware, or may be implemented by hardware executing corresponding software. The hardware or the software includes one or more modules corresponding to the foregoing function.

In a possible implementation, the user terminal includes a processing unit and a transceiver unit. The processing unit is configured to calculate a first message authentication code of first location privacy setting data. The transceiver unit is configured to send the first message authentication code and the first location privacy setting data to a data management network element.

In a possible implementation, the user terminal includes a processor, a transceiver, and a memory. The memory stores a computer program, and the computer program includes program instructions. The processor is configured to invoke the program code to perform the following operations of calculating a first message authentication code of first location privacy setting data, and controlling the transceiver to send the first message authentication code and the first location privacy setting data to a data management network element.

For a problem-resolving principle and beneficial effects of the user terminal, refer to the method and beneficial effects brought by the method in the second aspect. Therefore, for implementation of the apparatus, refer to implementation of the method. Repeated parts are not described again.

A fourth aspect of this embodiment of this application provides a computer-readable storage medium. The computer-readable storage medium stores instructions, and when the instructions are run on a computer, the computer is enabled to perform the method according to the second aspect.

A fifth aspect of this embodiment of this application provides a computer program product including instructions. When the computer program product runs on a computer, the computer is enabled to perform the method according to the second aspect.

A sixth aspect of this embodiment of this application provides a data transmission method, including the following.

A data management network element receives a first message authentication code and first location privacy setting data that are from a user terminal.

The data management network element obtains a second message authentication code of the first location privacy setting data.

If the second message authentication code is the same as the first message authentication code, the data management network element determines that the first location privacy setting data is not tampered with, and storing the first location privacy setting data.

According to the sixth aspect, the data management network element verifies whether the first message authentication code is the same as the second message authentication code to determine whether the first location privacy setting data is tampered with, to effectively prevent location privacy setting data from being tampered with, thereby ensuring end-to-end integrity protection of the location privacy setting data between the user terminal and the data management network element.

With reference to the sixth aspect, in a possible implementation, the data management network element may independently calculate the second message authentication code of the first location privacy setting data, for example, calculate the second message authentication code of the first location privacy setting data based on a first freshness parameter or a first random value. Alternatively, the data management network element may obtain the second message authentication code of the first location privacy setting data from an authentication service network element. For example, the data management network element notifies the authentication service network element of a first freshness parameter, and then the authentication service network element calculates the second message authentication code of the first location privacy setting data based on the first freshness parameter, and notifies the data management network element of the second message authentication code.

With reference to the sixth aspect, in a possible implementation, the data management network element obtains a third message authentication code of the first location privacy setting data, and sends the third message authentication code to the user terminal. The data management network element may independently calculate the third message authentication code of the first location privacy setting data, for example, calculate the third message authentication code of the first location privacy setting data based on a second freshness parameter or a second random value. Alternatively, the data management network element may obtain the third message authentication code of the first location privacy setting data from an authentication service network element. For example, the authentication service network element calculates the third message authentication code of the first location privacy setting data based on the second freshness parameter, and then notifies the data management network element of the third message authentication code.

With reference to the sixth aspect, in a possible implementation, when receiving second location privacy setting data from an access management network element, the data management network element updates stored location privacy setting data of the user terminal from the first location privacy setting data to the second location privacy setting data, so that another network element may obtain the location privacy setting data of the user terminal from the data management network element.

With reference to the sixth aspect, in a possible implementation, the data management network element receives a location privacy setting data obtaining request from a gateway mobile location network element, where the location privacy setting data obtaining request includes a third freshness parameter, and the third freshness parameter includes a third counter value and a third function counter value, perform digital signing on the first location privacy setting data based on the third freshness parameter, to obtain digital signature data, and send a location privacy setting data obtaining response to the gateway mobile location network element, where the location privacy setting data obtaining response includes the first location privacy setting data, the digital signature data, and the third freshness parameter. Alternatively, the data management network element performs digital signing on the first location privacy setting data based on a random value to obtain digital signature data, and then sends the random value, the digital signature data, and the first location privacy setting data to a gateway mobile location network element.

When providing the first location privacy setting data to the gateway mobile location network element, the data management network element also provides the digital signature data, so that the access management network element verifies, based on the digital signature data, whether action indication information delivered by the gateway mobile location network element is correct, thereby effectively protecting location information of the user terminal.

A seventh aspect of the embodiments of this application provides a data management network element. The data management network element has a function of implementing the method provided in the sixth aspect. The function may be implemented by hardware, or may be implemented by hardware executing corresponding software. The hardware or the software includes one or more modules corresponding to the foregoing function.

In a possible implementation, the data management network element includes a processing unit, a transceiver unit, and a storage unit. The transceiver unit is configured to receive a first message authentication code and first location privacy setting data that are from a user terminal, and obtain a second message authentication code of the first location privacy setting data. The processing unit is configured to, if the second message authentication code is the same as the first message authentication code, determine that the first location privacy setting data is not tampered with. The storage unit is configured to store the first location privacy setting data.

In a possible implementation, the data management network element includes a processor, a transceiver, and a memory. The memory stores a computer program, and the computer program includes program instructions. The processor is configured to invoke the program code to perform the following operations of controlling the transceiver to receive a first message authentication code and first location privacy setting data that are from a user terminal, obtaining a second message authentication code of the first location privacy setting data, and if the second message authentication code is the same as the first message authentication code, determining that the first location privacy setting data is not tampered with, and controlling the memory to store the first location privacy setting data.

For a problem-resolving principle and beneficial effects of the data management network element, refer to the method and beneficial effects brought by the method in the sixth aspect. Therefore, for implementation of the apparatus, refer to the implementation of the method. Repeated parts are not described again.

An eighth aspect of this embodiment of this application provides a computer-readable storage medium. The computer-readable storage medium stores instructions, and when the instructions are run on a computer, the computer is enabled to perform the method according to the sixth aspect.

A ninth aspect of this embodiment of this application provides a computer program product including instructions. When the computer program product runs on a computer, the computer is enabled to perform the method according to the sixth aspect.

A tenth aspect of this embodiment of this application provides a data transmission method, including the following.

An access management network element sends a location privacy setting data obtaining request to a data management network element when receiving a location service request from a gateway mobile location network element.

The access management network element receives a location privacy setting data obtaining response from the data management network element, where the location privacy setting data obtaining response includes first location privacy setting data.

The access management network element performs a location service operation based on the first location privacy setting data.

According to the tenth aspect, the access management network element directly obtains the first location privacy setting data from the data management network element, and performs a corresponding location service operation based on the first location privacy setting data, to prevent location information of the user terminal from being illegally obtained, thereby effectively protecting the location information of the user terminal.

With reference to the tenth aspect, in a possible implementation, performing, by the access management network element, a location service operation based on the first location privacy setting data further includes the following.

If the first location privacy setting data is allowing positioning but requiring to notify a user, the access management network element sends a notification message to the user terminal by using an access network, and requests to obtain location information of the user terminal.

If the first location privacy setting data is allowing positioning but not requiring to notify a user, the access management network element requests to obtain location information of the user terminal.

If the first location privacy setting data is requiring to notify a user and being authorized by the user to determine whether to allow positioning, the access management network element sends a notification message to the user terminal by using an access network, and when receiving a location permission message from the user terminal, requests to obtain location information of the user terminal.

With reference to the tenth aspect, in a possible implementation, the location privacy setting data obtaining response further includes first indication information, and the first indication information is used to indicate that the first location privacy setting data is requested by the access management network element for the first time.

Before performing the location service operation based on the first location privacy setting data, the access management network element further obtains second location privacy setting data from the user terminal based on the first indication information, and if the second location privacy setting data is the same as the first location privacy setting data, performs a step of performing the location service operation based on the first location privacy setting data.

With reference to the tenth aspect, in a possible implementation, if the second location privacy setting data is different from the first location privacy setting data, the access management network element is further configured to perform a location service operation based on the second location privacy setting data, and send the second location privacy setting data to the data management network element, so that the data management network element can store latest location privacy setting data.

With reference to the tenth aspect, in a possible implementation, when obtaining the location information of the user terminal, the access management network element generates second indication information, where the second indication information is used to indicate that positioning of the user terminal is completed, and sends the location information of the user terminal and the second indication information to the gateway mobile location network element, so that an external client can obtain the location information of the user terminal.

An eleventh aspect of the embodiments of this application provides an access management network element. The access management network element has a function of implementing the method provided in the tenth aspect. The function may be implemented by hardware, or may be implemented by hardware executing corresponding software. The hardware or the software includes one or more modules corresponding to the foregoing function.

In a possible implementation, the access management network element includes a processing unit and a transceiver unit. The transceiver unit is configured to send a location privacy setting data obtaining request to a data management network element when receiving a location service request from a gateway mobile location network element, and receive a location privacy setting data obtaining response from the data management network element, where the location privacy setting data obtaining response includes first location privacy setting data. The processing unit is configured to perform a location service operation based on the first location privacy setting data.

In a possible implementation, the access management network element includes a processor, a transceiver, and a memory. The memory stores a computer program, and the computer program includes program instructions. The processor is configured to invoke the program code to perform the following operations of controlling the transceiver to send a location privacy setting data obtaining request to the data management network element when receiving a location service request from a gateway mobile location network element, receiving a location privacy setting data obtaining response from the data management network element, where the location privacy setting data obtaining response includes first location privacy setting data, and performing a location service operation based on the first location privacy setting data.

For a problem-resolving principle and beneficial effects of the access management network element, refer to the method and beneficial effects brought by the method in the tenth aspect. Therefore, for implementation of the apparatus, refer to the implementation of the method. Repeated parts are not described again.

A twelfth aspect of this embodiment of this application provides a computer-readable storage medium. The computer-readable storage medium stores instructions, and when the instructions are run on a computer, the computer is enabled to perform the method according to the tenth aspect.

A thirteenth aspect of this embodiment of this application provides a computer program product including instructions. When the computer program product runs on a computer, the computer is enabled to perform the method according to the tenth aspect.

BRIEF DESCRIPTION OF DRAWINGS

To describe the technical solutions in some of the embodiments of this application more clearly, the following briefly describes the accompanying drawings used in describing the embodiments of this application.

FIG. 5C and FIG. 5D are a schematic flowchart of another data transmission method according to an embodiment of this application;

DESCRIPTION OF EMBODIMENTS

Figure 1:
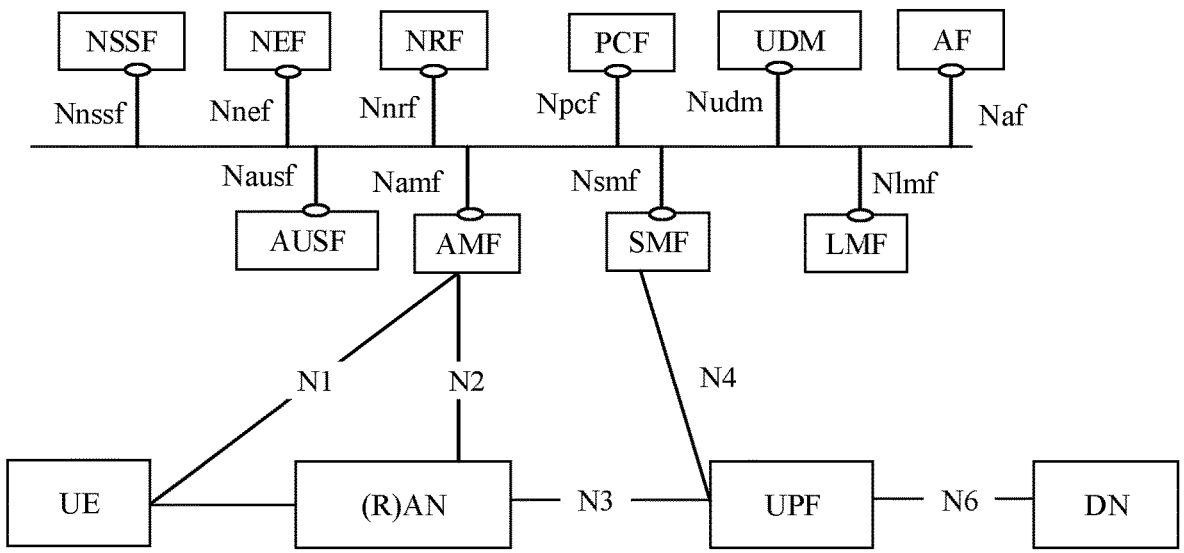
FIG. 1 is a schematic diagram of a network architecture of a 5G system.

The following describes the technical solutions in the embodiments of this application with reference to the accompanying drawings in the embodiments of this application. In descriptions of this application, "/" represents an "or" relationship between associated objects unless otherwise specified. For example, A/B may represent A or B. The term "and/or" in this application describes only an association relationship between associated objects and indicates that three relationships may exist. For example, A and/or B may indicate the following three cases: only A exists, both A and B exist, and only B exists, where A and B may be singular or plural. In addition, in the descriptions of this application, "a plurality of" means two or more than two. "At least one item (piece) of the following" or a similar expression thereof refers to any combination of these items, including any combination of a singular item (piece) or plural items (pieces). For example, at least one of a, b, or c may indicate a, b, c, a and b, a and c, b and c, or a, b, and c, where a, b, and c may be singular or plural. In addition, for convenience of clear description of the technical solutions in the embodiments of this application, terms such as "first" and "second" are used in the embodiments of this application to distinguish between same objects or similar objects that have basically same functions and purposes. A person skilled in the art may understand that the terms such as "first" and "second" do not intend to limit a quantity or an execution sequence, and the terms such as "first" and "second" do not indicate a definite difference.

In addition, the network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that with the evolution of the network architecture and the emergence of new service scenarios, the technical solutions provided in the embodiments of this application are also applicable to similar technical problems.

A user terminal in the embodiments of this application may include various handheld devices, vehicle-mounted devices, wearable devices, or computing devices that have a wireless communication function, or other processing devices connected to a wireless modem, or may include UE, a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, the UE, a mobile station (MS), a terminal device, relay UE, or the like. The relay user equipment may be, for example, a 5G residential gateway (RG). For ease of description, in the embodiments of this application, the devices mentioned above are collectively referred to as user terminals, and an example in which the user terminal is UE is used for description.

FIG. 1 is a schematic diagram of a network architecture of a 5G system. The network architecture includes UE, an access network (AN) device, and a core network element.

The access network device may alternatively be a RAN device.

The core network element may include these network elements: a user plane function (UPF), a data network (DN), an authentication server function (AUSF), an AMF, a session management function (SMF), a location management function (LMF), a network slice selection function (NSSF), a network exposure function (NEF), a network repository function (NRF), a policy control function (PCF), a UDM, and an application function (AF).

The AMF network element is a termination point of non-access stratum (NAS) signaling, and is mainly responsible for user access and mobility management.

The SMF network element is responsible for managing establishment, deletion, and the like of a session of a user, and maintaining a protocol data unit (PDU) session context and user plane forwarding pipeline information.

The LMF network element is configured to support location measurement, obtain location measurement information, and the like.

The NSSF network element is configured to support flexible slice selection based on information such as user-requested and subscribed network slice selection assistance information (NSSAI), a user location area, a slice capacity, and slice current load.

The NEF network element is used to support capability and event openness and provide functions such as information and internal and external information translation for external application security.

The NRF network element is configured to allow each network function to discover another network function and provide a service for the discovery.

The PCF network element is configured to generate and manage a user, session, and quality of service (QoS) flow processing policy.

The UDM network element is configured to support functions such as 3rd Generation Partnership Project (3GPP) authentication, user identity operation, permission granting, registration, and mobility management.

The AF network element is a functional network element that provides various business services, provides a framework, authentication, and an interface that are related to network capability exposure, and transmits information between a 5G system network function and another network function.

In the schematic diagram of the network architecture shown in FIG. 1, network elements in the embodiments of this application include UE, a RAN, an AMF, an LMF, a UDM, an AUSF, and an NEF.

In addition to network elements in a 5G network architecture, the network elements in the embodiments of this application further include a GMLC network element. As a first network element used by an external location application to access a core network, the GMLC network element performs a registration authentication task, and requests routing information from the UDM network element. The GMLC network element may be an independent network function network element, or may be included in the NEF network element.

In the schematic diagram of the network architecture shown in FIG. 1, an interface between network elements is further included. For example, N2 indicates an interface between the AMF network element and the RAN device. An interface between a network element and a communications bus is further included. For example, Namf represents an interface between the AMF network element and the communications bus.

Figure 2:
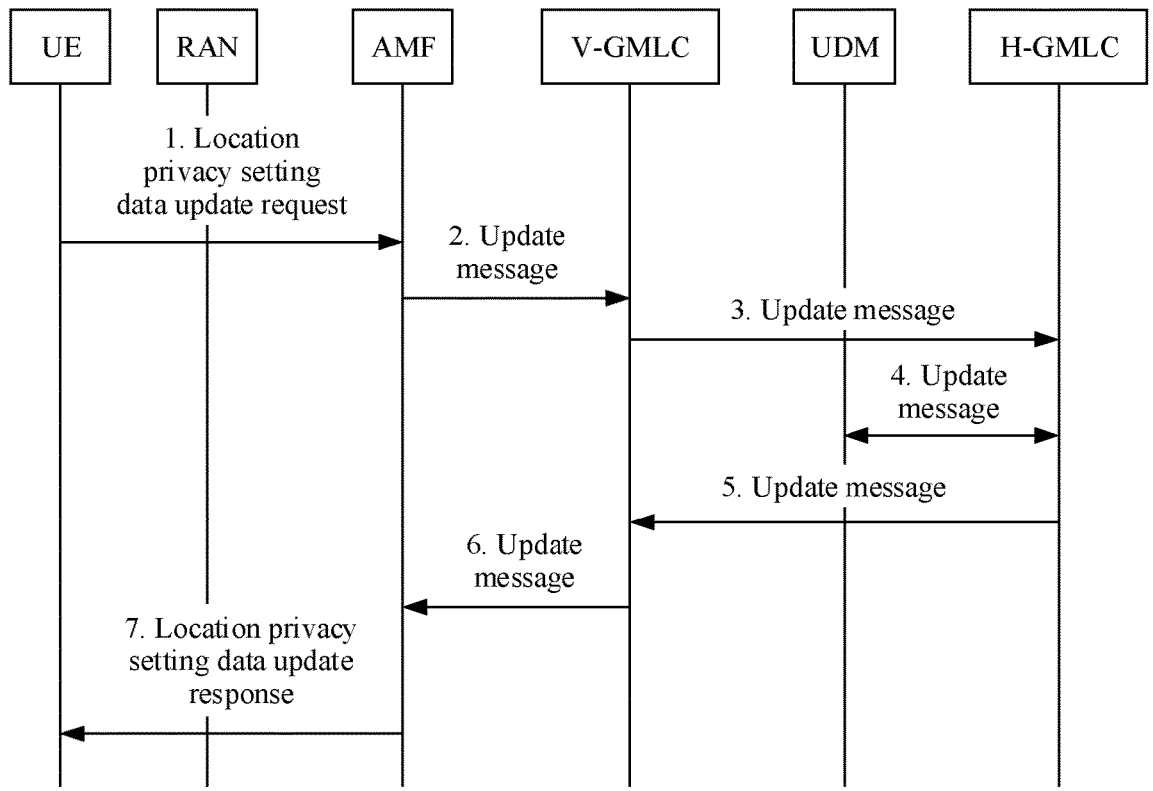
FIG. 2 is a schematic diagram of a process of updating location privacy setting data in a roaming scenario.

FIG. 2 is a schematic diagram of a current process of updating location privacy setting data in a roaming scenario. For UE using a 5G location service, a user may modify location privacy setting data on the UE at any time. An update process in a roaming scenario is shown in FIG. 2. The schematic flowchart shown in FIG. 2 includes the following steps.

1. UE sends a location privacy setting data update request (for example, a privacy setting update request) to an AMF or an LMF by using a RAN, where the location privacy setting data update request carries location privacy setting data. Correspondingly, the AMF or the LMF receives the location privacy setting data update request from the UE.

2. The AMF or the LMF sends an update message (for example, Nudm_UECM_update) to a visited GMLC (V-GMLC), where the update message carries the location privacy setting data reported by the UE. Correspondingly, the V-GMLC receives the update message from the AMF or the LMF.

3. The V-GMLC sends an update message (for example, Nudm_UECM_update) to a home GMLC (H-GMLC), where the update message carries the location privacy setting data reported by the UE. Correspondingly, the H-GMLC receives the update message from the V-GMLC.

4. The H-GMLC sends an update message (for example, Nudm_UECM_update) to the UDM, where the update message carries the location privacy setting data reported by the UE. Correspondingly, the UDM receives the update message from the H-GMLC. The UDM updates and saves the location privacy setting data reported by the UE, and sends an update message (for example, Nudm_UECM_update) to the H-GMLC, where the update message is used to indicate that the UDM has been updated. Correspondingly, the H-GMLC receives the update message from the UDM.

5. The H-GMLC sends an update message (for example, Nudm_UECM_update) to the V-GMLC, where the update message is used to indicate that the UDM has been updated. Correspondingly, the V-GMLC receives the update message from the H-GMLC.

6. The V-GMLC sends an update message (for example, Nudm_UECM_update) to the AMF or the LMF, where the update message is used to indicate that the UDM has been updated. Correspondingly, the AMF or the LMF receives the update message from the V-GMLC.

7. The AMF or the LMF sends a location privacy setting data update response (for example, a privacy setting update response) to the UE, where the location privacy setting data update response is used to respond to the location privacy setting data update request, and is used to indicate that the UDM has updated the location privacy setting data reported by the UE. Correspondingly, the UE receives the location privacy setting data update response from the AMF or the LMF.

In the schematic flowchart shown in FIG. 2, there is a risk of maliciously modifying, by the V-GMLC, the location privacy setting data reported by the UE. However, the UE and the UDM cannot perceive whether the location privacy setting data is modified. As a result, the UDM stores incorrect location privacy setting data, and consequently, the location privacy setting data between the UE and the UDM lacks effective end-to-end integrity protection.

In view of this, embodiments of this application provide a data transmission method and an apparatus thereof, to effectively prevent the location privacy setting data from being tampered with, thereby ensuring end-to-end integrity protection of the location privacy setting data between the UE and the UDM. In Embodiment 1 and Embodiment 2 of this application, end-to-end integrity protection of the location privacy setting data between the UE and the UDM can be ensured.

Figure 3A:
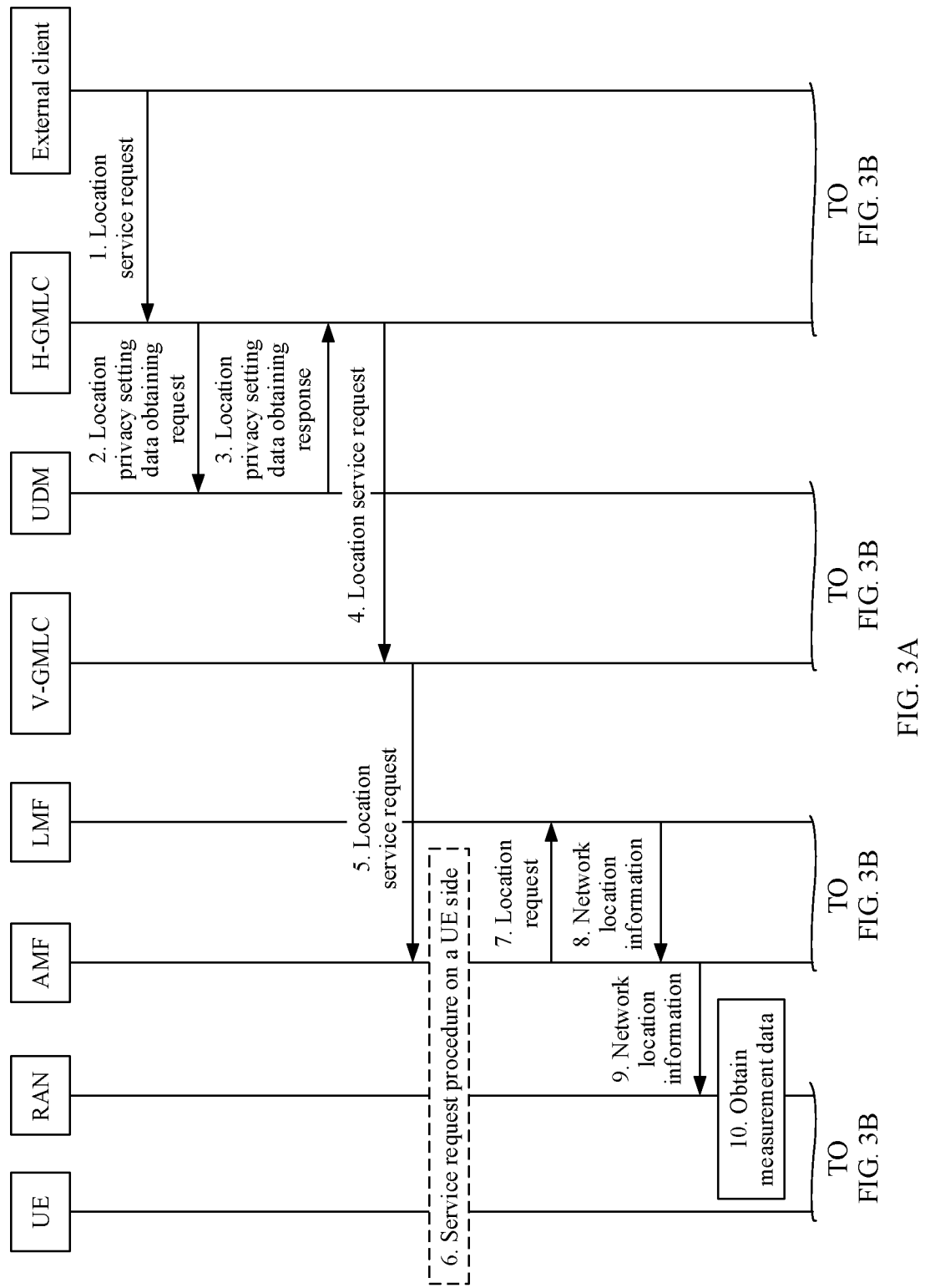
FIG. 3A and FIG. 3B are a schematic flowchart of currently obtaining location information of UE by an external client in a roaming scenario.
Figure 3B:
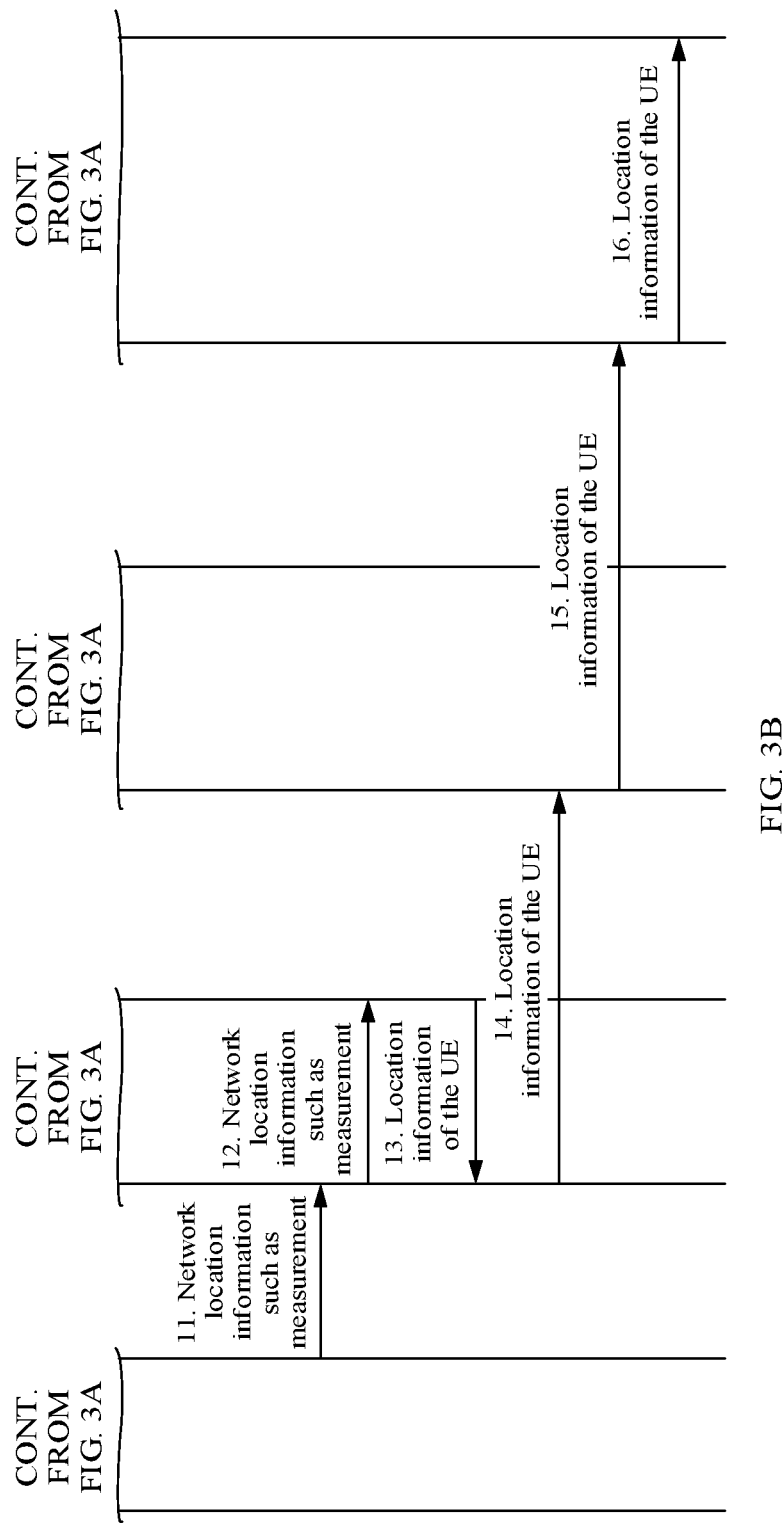

FIG. 3A and FIG. 3B are a schematic flowchart of currently obtaining location information of UE by an external client in a roaming scenario. The external client is configured to request to obtain the location information (for example, a current location of a user terminal) of the UE, and may be an application program on the UE, for example, a navigation application program that needs to obtain the location information of the UE, may be a server corresponding to an application program on the UE, or may be a server invoked by the UE in a running process. In addition to that the external client may request to obtain the location information of the UE, some functional network elements or network units in a core network may also request to obtain the location information of the UE.

The schematic flowchart shown in FIG. 3A and FIG. 3B includes the following steps.

1. An external client sends a location service request to an H-GMLC, where the location service request may be a location service (LCS) service request. Correspondingly, the H-GMLC receives the location service request from the external client. The external client may directly communicate with and connect to the H-GMLC. For example, in FIG. 3A and FIG. 3B, the external client directly sends the location service request to the H-GMLC. An NEF may exist between the external client and the H-GMLC, and the external client may send the location service request to the H-GMLC through the NEF.

2. The H-GMLC sends a location privacy setting data obtaining request to a UDM, where the location privacy setting data obtaining request is used to request to obtain location privacy setting data of UE. The location privacy setting data obtaining request may be a Nudm_UECM_Get_request. Correspondingly, the UDM receives the location privacy setting data obtaining request from the H-GMLC.

3. The UDM sends a location privacy setting data obtaining response to the H-GMLC, to respond to the location privacy setting data obtaining request. The location privacy setting data obtaining response may be a Nudm_UECM_Get_response. Correspondingly, the H-GMLC receives the location privacy setting data obtaining response from the UDM. The location privacy setting data obtaining response includes the location privacy setting data of the UE. When the H-GMLC obtains the location privacy setting data of the UE, if the location privacy setting data is not allowing positioning, the H-GMLC directly feeds back a location service response to the external client, and the location service response indicates that a location service is rejected. When the location privacy setting data is not disallowing positioning, the location privacy setting data may be converted into action indication information, to indicate an AMF to perform a corresponding location service operation. For example, if the location privacy setting data is requiring to notify a user and being authorized by the user to determine whether to allow positioning, the action indication information is used to indicate the AMF to send a notification message to the UE and request to obtain location information of the UE when receiving a location permission message of the UE, and the notification message is used to request whether the UE allows an external client to request the location information of the UE. If the UE allows positioning, the UE feeds back the location permission message to the AMF. For another example, if the location privacy setting data is allowing positioning but requiring to notify a user, the action indication information is used to indicate the AMF to send a notification message to the UE and indicate the AMF to request to obtain location information of the UE, and the notification message is used to indicate the external client to obtain the location information of the UE. For another example, if the location privacy setting data is allowing positioning but not requiring to notify a user, the action indication information is used to indicate the AMF to request to obtain the location information of the UE.

4. The H-GMLC sends a location service request to a V-GMLC, where the location service request may be an LCS service request. Correspondingly, the V-GMLC receives the location service request from the H-GMLC. The location service request includes action indication information. For example, when the location privacy setting data obtained by the H-GMLC is allowing positioning, the H-GMLC sends the location service request to the V-GMLC, where the action indication information carried in the location service request is used to indicate to obtain the location information of the UE.

5. The V-GMLC sends a location service request to the AMF. Correspondingly, the AMF receives the location service request from the V-GMLC. The location service request may be a Namf_Location_Provide_positioningInfo_request. The location service request includes action indication information, to indicate the AMF to perform a corresponding location service operation.

6. If the UE is in an idle mode, the AMF triggers a network side service request to the UE. If the UE is in the idle mode, it indicates that no NAS signaling connection is established between the UE and the AMF. In this case, the AMF triggers a service request procedure on a UE side to establish a secure communication connection between the UE and a core network.

If the action indication information indicates the AMF to request to obtain the location information of the UE and sends the notification message to the UE, in a process of performing step 6, the AMF sends a notification message to the UE by using a RAN, where the notification message is used to notify the user that the external client is to obtain the location information of the UE, and then the AMF performs step 7 and subsequent steps. If the action indication information indicates the AMF to send the notification message to the UE and request to obtain the location information of the UE when receiving the location permission message of the UE, in a process of performing step 6, the AMF sends a notification message to the UE by using a RAN, the notification message is used to request whether the user allows the external client to obtain the location information of the UE. If the user authorizes to allow positioning, the UE sends the location permission message to the AMF by using the RAN, and the AMF performs step 7 and subsequent steps when receiving the location permission message. If the user does not authorize to allow positioning, the UE sends a location rejection message to the AMF by using the RAN. After receiving the location rejection message, the AMF feeds back the location rejection message to the GMLC, and the GMLC feeds back the location rejection message to the external client. If the action indication information indicates the AMF to request to obtain the location information of the UE, the AMF performs step 7 and subsequent steps.

7. The AMF sends a location request to an LMF. Correspondingly, the LMF receives the location request from the AMF. The location request may be a Nlmf_Location_DetermineLocation Request.

8. The LMF delivers network location information to the AMF. Correspondingly, the AMF receives the network location information from the LMF. The LMF may deliver network location information to the AMF by using a Namf_Communication_N1N2 transfer message.

9. The AMF delivers the network location information to the RAN. Correspondingly, the RAN receives the network location information from the AMF. The AMF may deliver the network location information to the RAN by using an N2 transfer message.

10. The RAN obtains measurement data, where the measurement data may include signal strength and the like.

11. The RAN reports the network location information such as measurement data to the AMF. Correspondingly, the AMF receives the network location information such as measurement from the RAN. The RAN may send the network location information such as measurement to the AMF by using the N2 transfer message.

12. The AMF reports the network location information such as measurement to the LMF. Correspondingly, the LMF receives the network location information such as measurement from the AMF. The AMF may send the network location information such as measurement to the AMF by using a Namf_Communication_N1N2Info notify. The LMF may obtain the location information of the UE through calculation based on the network location information such as measurement reported by the AMF. For example, if the UE is connected to a wireless hotspot (WI-FI), the LMF may obtain the location information of the UE through calculation based on the network location information such as a location of the wireless hotspot and the signal strength.

13. The LMF delivers the location information of the UE to the AMF. Correspondingly, the AMF receives the location information of the UE from the LMF.

14. The AMF reports the location information of the UE to the V-GMLC. Correspondingly, the V-GMLC receives the location information of the UE from the AMF.

15. The V-GMLC reports the location information of the UE to the H-GMLC. Correspondingly, the H-GMLC receives the location information of the UE from the V-GMLC. The V-GMLC may add the location information of the UE to the LCS service response.

16. The H-GMLC sends the location information of the UE to the external client. Correspondingly, the external client receives the location information of the UE from the H-GMLC. The H-GMLC may add the location information of the UE to the LCS service response.

In the schematic flowchart shown in FIG. 3A and FIG. 3B, if the location privacy setting data of the UE is requiring to notify the user and being authorized by the user to determine whether to allow positioning, but an error indication delivered by the V-GMLC or the H-GMLC to the AMF is allowing positioning and not requiring to notify the user, the location information of the UE may be illegally obtained, and the UE is unaware. Consequently, the location information of the UE is disclosed. A visited network may also tamper with the location privacy setting data of the UE. As a result, the GMLC delivers an error indication. The visited network may include the AMF, or include the AMF and the LMF, or the like. Embodiment 3 and Embodiment 4 of this application can overcome the disadvantage, to prevent the visited network or the GMLC from delivering the error indication, thereby effectively protecting the location information of the UE.

Figure 4:
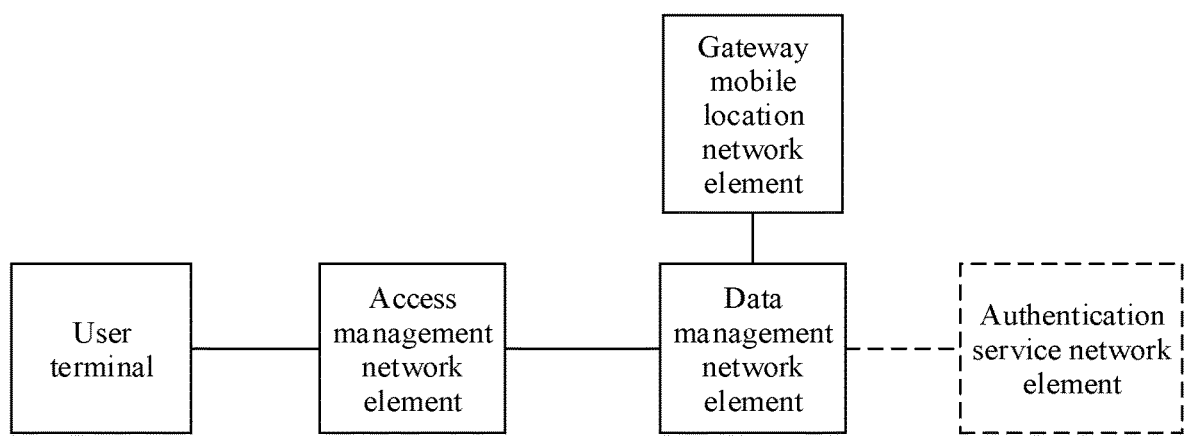
FIG. 4 is a schematic diagram of a network architecture according to an embodiment of this application.

FIG. 4 is a schematic diagram of a network architecture to which an embodiment of this application is applied. The network architecture includes a user terminal, a data management network element, an access management network element, and a gateway mobile location network element. An access network device between the user terminal and the access management network element is omitted in the network architecture shown in FIG. 4. The access network device may be a RAN device, or may be an AN device. For ease of description, in the description of the network architecture shown in FIG. 4 and the subsequent method embodiments, two words "network element" are not shown in the figures corresponding to the embodiments, and the two words "network element" are not indicated in specific descriptions of the embodiments. However, this does not affect understanding of the embodiments of this application.

The user terminal may be user equipment such as UE. The data management network element may be a UDM in a 5G system, or may be a network element that has a same function as a UDM in a future communications system. The access management network element may be an AMF in the 5G system, or may be a network element that has a same function as an AMF in the future communications system. The gateway mobile location network element may be a GMLC, or may be a network element that has a same function as a GMLC in the future communications system. The embodiments of this application further relate to an authentication service network element. The authentication service network element may be an AUSF in the 5G system, or may be a network element that has a same function as an AUSF in the future communications system. A location management network element is further related. The location management network element may be an LMF in the 5G system, or may be a network element that has a same function as an LMF in the future communications system. It should be noted that names of network elements in the embodiments of this application do not constitute a limitation on the embodiments of this application.

In the embodiments of this application, the user terminal may report, to the data management network element by using an access network element and a core network element, location privacy setting data entered or updated by a user. In a possible implementation, the core network element includes the access management network element. In another possible implementation, the core network element includes the access management network element and a location management network element. In still another possible implementation, the core network element includes the access management network element, a location management network element, and the gateway mobile location network element. When reporting the location privacy setting data, the user terminal may report a calculated first message authentication code of the location privacy setting data to the data management network element, so that the data management network element verifies, based on the first message authentication code, whether the location privacy setting data is maliciously modified by a visited network or the gateway mobile location network element in a process of reporting the location privacy setting data by the user terminal to the data management network element. The user terminal may use a private key of the user terminal to perform digital signing on the location privacy setting data entered or updated by the user, so that the data management network element verifies, based on digital signing, whether the location privacy setting data is maliciously modified by the visited network or the gateway mobile location network element in a process of reporting the location privacy setting data by the user terminal to the data management network element. The user terminal may further perform secondary authentication to further check whether the location privacy setting data is maliciously modified by the visited network or the gateway mobile location network element.

In the embodiments of this application, the data management network element may store and update the location privacy setting data, and may perform digital signing on the location privacy setting data stored in the data management network element, so that the user terminal verifies whether the location privacy setting data saved in the data management network element is tampered with. In another possible implementation, the data management network element performs digital signing on the location privacy setting data, so that the access management network element verifies a malicious indication that is delivered by the gateway mobile location network element and that does not match the location privacy setting data. The data management network element may further obtain a second message authentication code of the location privacy setting data, and when the first message authentication code is the same as the second message authentication code, determine that the location privacy setting data is not tampered with. The data management network element may independently obtain the second message authentication code, that is, independently calculate the second message authentication code, or may obtain, from the authentication service network element, a second message authentication code calculated by the authentication service network element.

In the embodiments of this application, when receiving a location service request from the gateway mobile location network element, the access management network element requests to obtain the location privacy setting data of the user terminal from the data management network element, and performs a corresponding location service operation based on the location privacy setting data. For example, if the first location privacy setting data is requiring to notify a user and being authorized by the user to determine whether to allow positioning, the access management network element sends a notification message to the user terminal by using the access network, and when receiving a location permission message from the user terminal, requests to obtain location information of the user terminal. The access management network element may further obtain current location privacy setting data of the user terminal from the user terminal, and compare the current location privacy setting data with the location privacy setting data obtained from the data management network element. If the current location privacy setting data is different from the location privacy setting data obtained from the data management network element, the access management network element may send the current location privacy setting data to the data management network element, so that the data management network element updates the location privacy setting data of the user terminal. In another possible implementation, when receiving action indication information and data signature data from the gateway mobile location network element, the access management network element verifies whether the digital signature data matches the action indication information, and if the digital signature data does not match the action indication information, determines that the gateway mobile location network element delivers an error indication.

The network architecture shown in FIG. 4 further includes the authentication service network element. In the embodiments of this application, the service authentication network element may obtain the second message authentication code and a third message authentication code through calculation. The service authentication network element may receive the first message authentication code from the user terminal, and determine whether the first message authentication code is the same as the second message authentication code, to determine whether the location privacy setting data reported by the user terminal is tampered with. The service authentication network element may also send the second message authentication code and the third message authentication code to the data management network element, and the data management network element determines whether the first message authentication code is the same as the second message authentication code. When determining that the first message authentication code is the same as the second message authentication code, the data management network element delivers the third message authentication code to the user terminal.

In the embodiments of this application, an example in which the user terminal is the UE, the access management network element is the AMF network element, the data management network element is the UDM network element, the authentication service network element is the AUSF network element, the gateway mobile location network element is the GMLC, and the location management network element is the LMF is used for description.

The gateway mobile location network element may be classified into a V-GMLC and an H-GMLC in a roaming scenario. In a non-roaming scenario, the V-GMLC and the H-GMLC may not be distinguished. The H-GMLC can communicate with an external client directly or through an NEF. The embodiments of this application may be applied to a roaming scenario, or may be applied to a non-roaming scenario. If the embodiments of this application are applied to the non-roaming scenario, a V-GMLC and an H-GMLC in each of FIG. 5A and FIG. 5B, FIG. 5C and FIG. 5D, FIG. 6A and FIG. 6B, FIG. 7A and FIG. 7B, and FIG. 8A and FIG. 8B are processed as one GMLC.

Terms or names used in the embodiments of this application are explained below.

The positioning privacy setting data, namely, data that is set by the user on the UE and whether is allowing positioning may include, for example, the following several cases: (1) not allowing positioning, (2) requiring to notify the user and being authorized by the user to determine whether to allow positioning, and there are two cases: one is that positioning is performed only when the user is authorized to allow positioning, and the other is that positioning is performed when the user is authorized to allow positioning or when the user does not respond, (3) allowing positioning but requiring to notify the user, and (4) allowing positioning but not requiring to notify the user.

A freshness parameter is used to protect a network from a low-altitude replay attack. In the embodiments of this application, the freshness parameter is used to calculate a message authentication code and perform digital signing.

A message authentication code is applied to the embodiments of this application, and is used to check whether location privacy setting data is tampered with.

A counter value is a type of freshness parameter, and is used to indicate a quantity of times of sending a specific message.

A function counter (FC) value is a type of freshness parameter, and different counter values are allocated to messages based on functions.

The following describes in detail the data communication method provided in the embodiments of this application. It should be noted that FIG. 5A and FIG. 5B, FIG. 5C and FIG. 5D, and FIG. 6A and FIG. 6B to FIG. 8A and FIG. 8B are described by using a roaming scenario as an example. When the embodiments shown in FIG. 5A and FIG. 5B, FIG. 5C and FIG. 5D, and FIG. 6A and FIG. 6B to FIG. 8A and FIG. 8B are described, an access network between UE and an AMF is omitted. In actual application, there is an access network between the UE and the AMF.

Figure 5A:
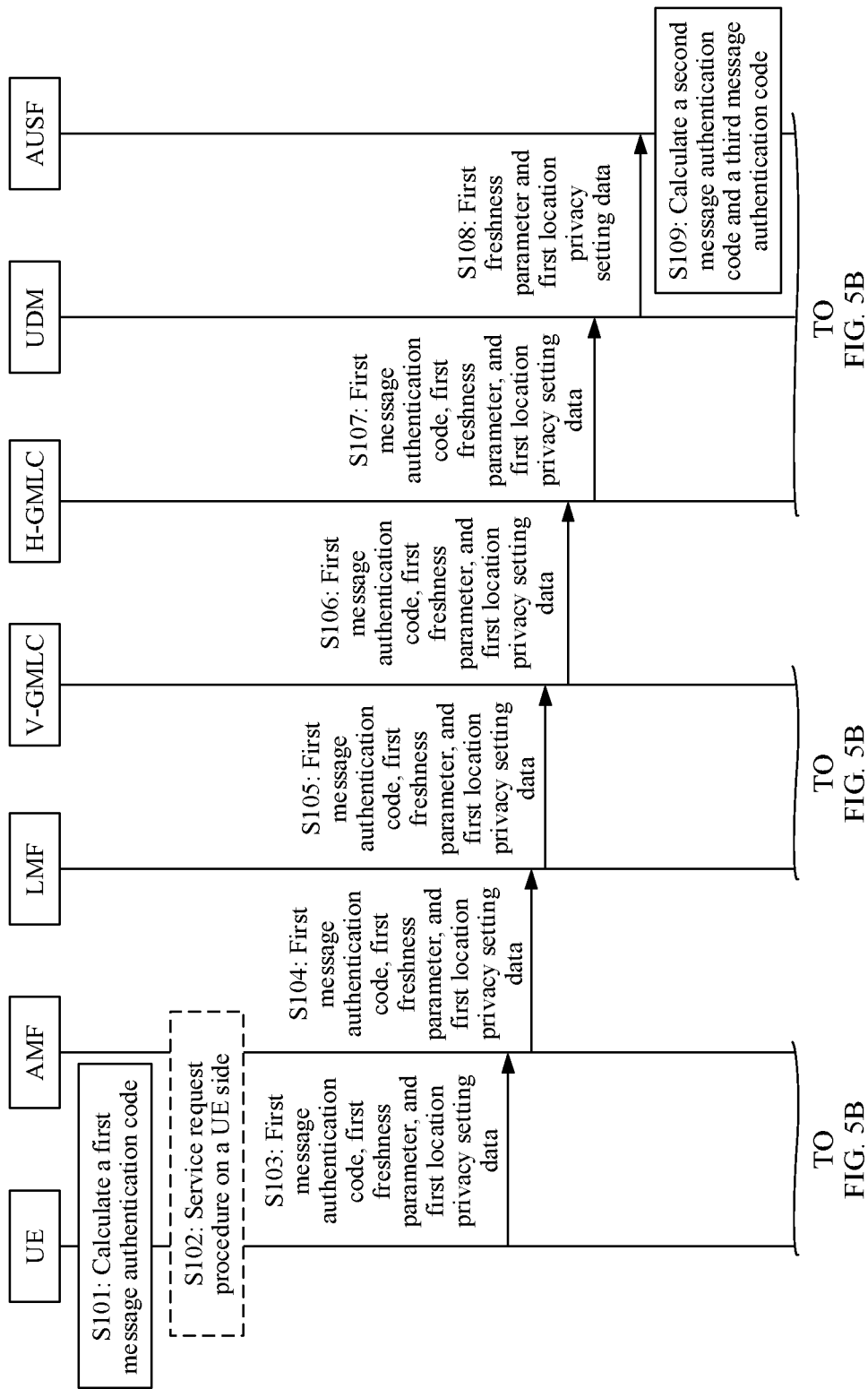
FIG. 5A and FIG. 5B are a schematic flowchart of a data transmission method according to an embodiment of this application.
Figure 5B:
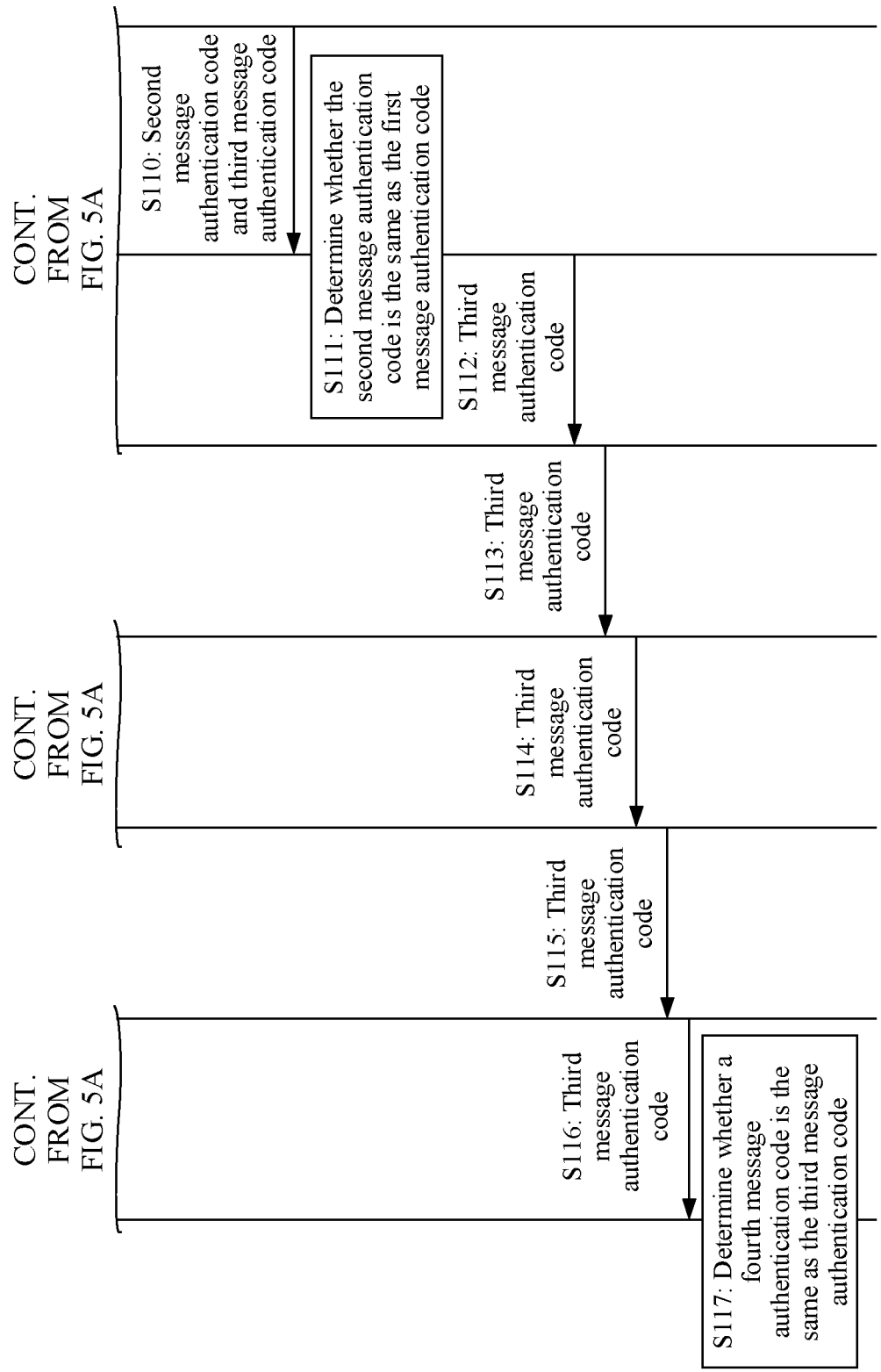

An example in which this embodiment of this application is applied to the schematic diagram of the network architecture shown in FIG. 4 is used. FIG. 5A and FIG. 5B are a schematic flowchart of a data transmission method according to Embodiment 1 of this application. In this embodiment, UE calculates a message authentication code of location privacy setting data, to effectively prevent the location privacy setting data from being tampered with, thereby ensuring end-to-end integrity protection of location privacy setting data between the UE and a UDM. The embodiment shown in FIG. 5A and FIG. 5B may include but are not limited to the following steps.

Step S101: UE calculates a first message authentication code of first location privacy setting data.

The first location privacy setting data is location privacy setting data entered or updated by a user on the UE. The UE may save the first location privacy setting data, so that the UE may report the first location privacy setting data to a UDM.

The UE may calculate the first message authentication code of the first location privacy setting data based on an input key and a first input parameter. Further, the UE derives a key used to calculate a message authentication code of location privacy setting data, and uses the key as the input key. The UE calculates a hash value for the first location privacy setting data by using the input key and the first input parameter, and the hash value is the first message authentication code.

The first input parameter may include a first freshness parameter, the first location privacy setting data, and the like. The first freshness parameter may include a first counter value and/or a first function counter (FC) value. In this embodiment of this application, an example in which the freshness parameter includes a counter value and an FC value is used for description. A specific value of the first counter value is maintained by the UE, and a specific value of the first FC value is fixed. The first message authentication code may be represented as PS-MAC-Iue or MACue. The Kausf is a key determined through negotiation between the UE and a network when the UE registers with the network, and an AUSF or a UDM on a network side may derive and determine a same key Kausf. For a specific process, refer to the other approaches. Details are not described herein.

A UE side and the network side each use a same input key and a same input parameter to calculate a hash value. If the hash value calculated by the UE side and the hash value of the network side are different, it indicates that the location privacy setting data is tampered with in a transmission process.

Step S102: If the UE is in an idle mode, a service request procedure on the UE side is triggered.

If the UE is in the idle mode, it indicates that no NAS signaling connection is established between the UE and an AMF. In this case, the service request procedure on the UE side is triggered to establish a secure communication connection between the UE and a core network. If the UE is in a connected mode, step S102 may not be performed.

Step S103: The UE sends the first message authentication code, the first freshness parameter, and the first location privacy setting data to the AMF by using a RAN. Correspondingly, the AMF receives the first message authentication code, the first freshness parameter, and the first location privacy setting data from the UE.

The UE may send the first message authentication code, the first freshness parameter, and the first location privacy setting data to the AMF by using a NAS transport message, that is, the first message authentication code, the first freshness parameter, and the first location privacy setting data are carried in the NAS transport message. The NAS transport message may be a separate NAS message or may be a part of a registration request message. The first message authentication code, the first freshness parameter, and the first location privacy setting data may further be carried in a Radio Resource Control (RRC) connection reconfiguration message sent by the UE to the RAN or carried in an N2 message sent by the RAN to the AMF.

Step S104: The AMF sends the first message authentication code, the first freshness parameter, and the first location privacy setting data to an LMF. Correspondingly, the LMF receives the first message authentication code, the first freshness parameter, and the first location privacy setting data from the AMF.

When sending the first message authentication code, the first freshness parameter, and the first location privacy setting data to the LMF, the AMF may add the first message authentication code, the first freshness parameter, and the first location privacy setting data to one message, and the message may be, for example, a Namf_Communication_N1 message notify.

Step S105: The LMF sends the first message authentication code, the first freshness parameter, and the first location privacy setting data to a V-GMLC. Correspondingly, the V-GMLC receives the first message authentication code, the first freshness parameter, and the first location privacy setting data from the LMF.

When sending the first message authentication code, the first freshness parameter, and the first location privacy setting data to the V-GMLC, the LMF may add the first message authentication code, the first freshness parameter, and the first location privacy setting data to one message, and the message may be, for example, a Ngmlc_UserPrivacy_Set request.

Step S106: The V-GMLC sends the first message authentication code, the first freshness parameter, and the first location privacy setting data to an H-GMLC. Correspondingly, the H-GMLC receives the first message authentication code, the first freshness parameter, and the first location privacy setting data from the V-GMLC.

When sending the first message authentication code, the first freshness parameter, and the first location privacy setting data to the H-GMLC, the V-GMLC may add the first message authentication code, the first freshness parameter, and the first location privacy setting data to one message, and the message may be, for example, a Ngmlc_UserPrivacy_Set request.

Step S107: The H-GMLC sends the first message authentication code, the first freshness parameter, and the first location privacy setting data to the UDM. Correspondingly, the UDM receives the first message authentication code, the first freshness parameter, and the first location privacy setting data from the H-GMLC.

When sending the first message authentication code, the first freshness parameter, and the first location privacy setting data to the UDM, the H-GMLC may add the first message authentication code, the first freshness parameter, and the first location privacy setting data to one message, and the message may be, for example, a Nudm_UECM_Update request.

It may be understood that, step S103 to step S107 are a process in which the UE reports the first message authentication code, the first freshness parameter, and the first location privacy setting data to the UDM by using the RAN and core network elements. The core network elements related in the process include the AMF, the LMF, the V-GMLC, and the H-GMLC. The reporting process is UE→AMF→LMF→V-GMLC→H-GMLC→UDM.

In a possible implementation, the UE reports the first message authentication code, the first freshness parameter, and the first location privacy setting data to the UDM by using the RAN and the AMF. In this case, a related core network element includes the AMF, and the reporting process is UE→AMF→UDM. In another possible implementation, the UE reports the first message authentication code, the first freshness parameter, and the first location privacy setting data to the UDM by using the RAN, the AMF, and the LMF. In this case, related core network elements include the AMF and the LMF, and the reporting process is UE→AMF→LMF→UDM.

In a non-roaming scenario, the LMF may send the first message authentication code, the first freshness parameter, and the first location privacy setting data to a GMLC, and then the GMLC sends the first message authentication code, the first freshness parameter, and the first location privacy setting data to the UDM. In a non-roaming scenario, a process in which the UE reports the first message authentication code, the first freshness parameter, and the first location privacy setting data to the UDM may be: UE→AMF→UDM, UE→AMF→LMF→UDM, or UE→AMF→LMF→GMLC→UDM.

In this embodiment of this application, a manner of reporting data to the UDM by the UE is not limited, and a manner of delivering data to the UE by the UDM is not limited either.

The first freshness parameter includes the first counter value and the first FC value. Because the first FC value is fixed, the network element in the core network may learn that the first freshness parameter transmitted in step S103 to step S107 may be the first counter value.

Step S108: The UDM sends the first location privacy setting data and the first freshness parameter to the AUSF. Correspondingly, the AUSF receives the first location privacy setting data and the first freshness parameter from the UDM.

When sending the first location privacy setting data and the first freshness parameter to the AUSF, the UDM may add the first location privacy setting data and the first freshness parameter to one message, and the message, for example, may be a Nausf_protection request.

Step S109: The AUSF calculates a second message authentication code and a third message authentication code of the first location privacy setting data.

The AUSF may calculate the second message authentication code of the first location privacy setting data based on an input key Kausf and a first input parameter. The second message authentication code may be represented as PS-MAC-Iue' or MACue'.

The AUSF may calculate the third message authentication code of the location privacy setting data based on the input key Kausf and a second input parameter. The second input parameter may include a second freshness parameter and the first location privacy setting data, and the second freshness parameter includes the first counter value and/or a second FC value. A specific value of the second FC value is fixed, but the second FC value is different from the first FC value. The third message authentication code may be represented as PS-MAC-Iausf or MACausf.

Step S110: The AUSF sends the second message authentication code and the third message authentication code to the UDM. Correspondingly, the UDM receives the second message authentication code and the third message authentication code from the AUSF.

When sending the second message authentication code and the third message authentication code to the UDM, the AUSF may add the second message authentication code and the third message authentication code to one message, and the message may be, for example, a Nausf_protection response.

Step S111: The UDM determines whether the first message authentication code is the same as the second message authentication code.

The UDM determines whether the first message authentication code is the same as the second message authentication code. If the first message authentication code is the same as the second message authentication code, it indicates that the first location privacy setting data reported by the UE to the UDM is not maliciously modified by a visited network or the GMLC, and the UDM stores and updates the location privacy setting data of the UE, that is, the received first location privacy setting data is stored as latest location privacy setting data of the UE. If the first message authentication code is different from the second message authentication code, it indicates that the first location privacy setting data reported by the UE to the UDM is maliciously modified by a visited network or the GMLC.

Step S112: The UDM sends the third message authentication code to the H-GMLC. Correspondingly, the H-GMLC receives the third message authentication code from the UDM.

When the first message authentication code is the same as the second message authentication code, the UDM may send the third message authentication code to the H-GMLC by using one message, and the message may be, for example, an Nudm_UECM_Update response.

Step S113: The H-GMLC sends the third message authentication code to the V-GMLC. Correspondingly, the V-GMLC receives the third message authentication code from the H-GMLC.

The H-GMLC may send the third message authentication code to the V-GMLC by using one message, and the message may be, for example, an Ngmlc_UserPrivacy_Set response.

Step S114: The V-GMLC sends the third message authentication code to the LMF. Correspondingly, the LMF receives the third message authentication code from the V-GMLC.

The V-GMLC may send the third message authentication code to the LMF by using one message, and the message may be, for example, an Ngmlc_UserPrivacy_Set response.

Step S115: The LMF sends the third message authentication code to the AMF. Correspondingly, the AMF receives the third message authentication code from the LMF.

The LMF may send the third message authentication code to the AMF by using one message, and the message may be, for example, an Namf_Communication_N1 message notify.

Step S116: The AMF sends the third message authentication code to the UE. Correspondingly, the UE receives the third message authentication code from the LMF.

The AMF sends the third message authentication code to the UE by using the RAN. The AMF may send the third message authentication code to the UE by using one message, and the message may be, for example, a NAS transport message.

It may be understood that step S109 to step S113 are a process in which the UDM delivers the third message authentication code to the UE, and the process is UDM→H-GMLC→N-GMLC→LMF→AMF→UE. In a possible implementation, the UDM delivers the third message authentication code to the UE by using the RAN and the AMF, and the delivery process is UDM→AMF→UE. In another possible implementation, the UDM delivers the third message authentication code to the UE by using the RAN, the AMF, and the LMF, and the delivery process is UDM→LMF→AMF→UE.

In a non-roaming scenario, the UDM may send the third message authentication code to the GMLC, and then the GMLC sends the third message authentication code to the LMF. In a non-roaming scenario, a process in which the UDM delivers the third message authentication code to the UE may be: UDM→GMLC→LMF→AMF→UE, UDM→GMLC→LMF→AMF→UE→AMF→UE, or UDM→LMF→AMF→UE.

Step S117: The UE calculates a fourth message authentication code of the first location privacy setting data, and determines whether the third message authentication code is the same as the fourth message authentication code.

The UE may calculate the third message authentication code of the location privacy setting data based on the input key Kausf and the second input parameter. The second input parameter may include the second freshness parameter and the first location privacy setting data, and the second freshness parameter includes the first counter value and/or the second FC value. The specific value of the second FC value is fixed, but the second FC value is different from the first FC value. The third message authentication code may be represented as PS-MAC-Iausf or MACausf.

It may be understood that the second FC value is specific to the AUSF, the first FC value is specific to the UE, the first FC value is used to calculate the first message authentication code and the second message authentication code, and the second FC value is used to calculate the third message authentication code and the fourth message authentication code, to perform secondary authentication. In Embodiment 1 shown in FIG. 5A and FIG. 5B, once authentication is performed by the UDM, and once authentication is performed by the UE.

The fourth message authentication code may be represented as PS-MAC-Iausf' or MACausf'.

If the third message authentication code is the same as the fourth message authentication code, the first location privacy setting data reported by the UE to the UDM is not maliciously modified by the visited network or the GMLC. If the third message authentication code is different from the fourth message authentication code, it indicates that the first location privacy setting data reported by the UE to the UDM is maliciously modified by the visited network or the GMLC.

In Embodiment 1 shown in FIG. 5A and FIG. 5B, the UE calculates the first message authentication code of the first location privacy setting data, the AUSF calculates the second message authentication code and the third message authentication code of the first location privacy setting data, and the UDM determines whether the first message authentication code is the same as the second message authentication code. When receiving the third message authentication code, the UE calculates the fourth message authentication code, and determines whether the third message authentication code is the same as the fourth message authentication code. Two authentication processes can effectively prevent the location privacy setting data from being tampered with, thereby ensuring end-to-end integrity protection of the location privacy setting data between the UE and the UDM.

It should be noted that calculating the message authentication code based on the freshness parameter is a possible implementation, and does not constitute a limitation on this embodiment of this application. For example, the message authentication code may further be calculated based on a random value. Further, the UE calculates the first message authentication code of the first location privacy setting data based on a first random value, and then the UE sends the first message authentication code, the first location privacy setting data, and the first random value to the UDM. The UDM sends the first random value and the first location privacy setting data to the AUSF. The AUSF calculates the second message authentication code based on the first random value, generates a second random value, and calculates the third message authentication code based on the second random value. Then, the AUSF sends the second message authentication code, the third message authentication code, and the second random value to the UDM. When determining that the second message authentication code is the same as the third message authentication code, the UDM delivers the third message authentication code and the second random value to the UE, and the UE calculates the fourth message authentication code based on the second random value.

Further, in a subsequent embodiment, performing digital signing based on the freshness parameter is also a possible implementation, and does not constitute a limitation on this embodiment of this application. For example, the UE performs digital signing on the first location privacy setting data based on a random value and a private key of the UE, the UDM performs digital signing on the first location privacy setting data based on another random value and the private key of the UDM.

In Embodiment 1 shown in FIG. 5A and FIG. 5B, that the UDM obtains the second message authentication code from the AUSF is a possible implementation, and does not constitute a limitation on this embodiment of this application. The UDM may alternatively obtain the second message authentication code in another manner. For example, the UDM autonomously calculates the second message authentication code. Similarly, this also applies to the third message authentication code.

Figure 5D:
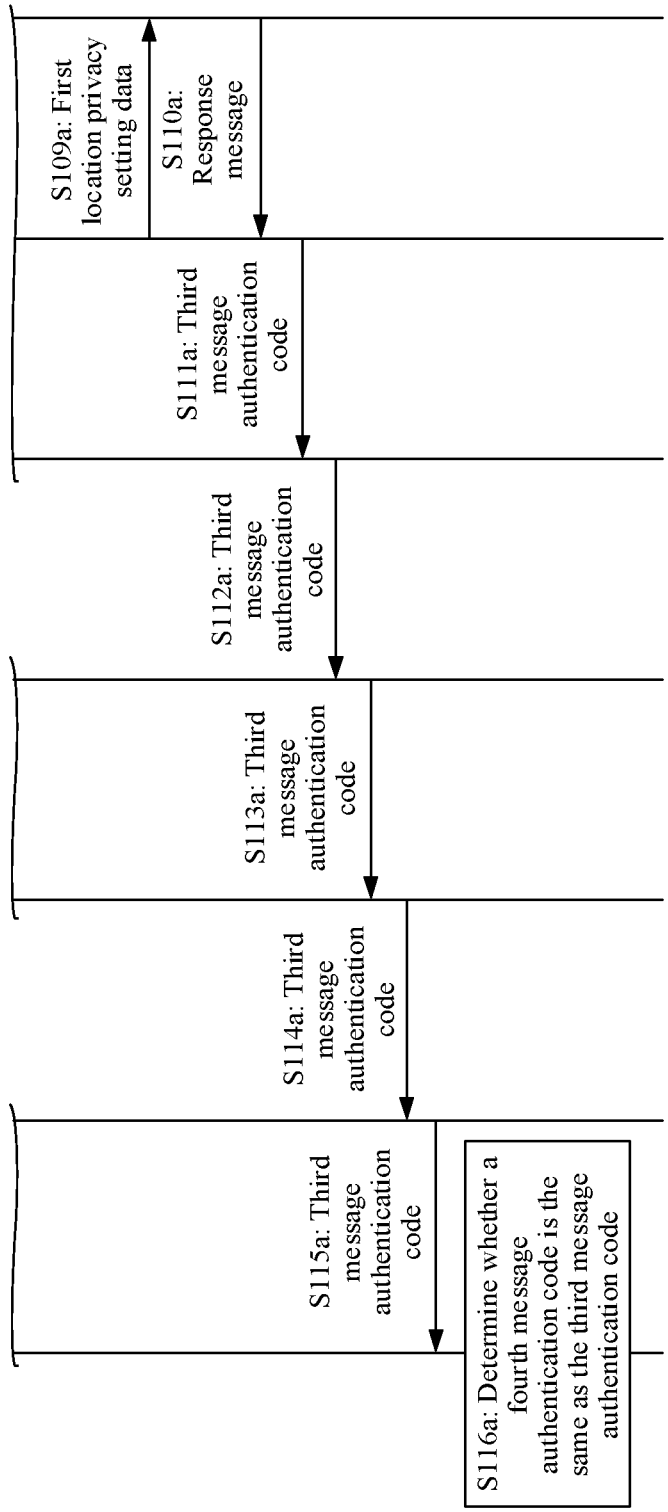

An example in which this embodiment of this application is applied to the schematic diagram of the network architecture shown in FIG. 4 is used. FIG. 5C and FIG. 5D are a schematic flowchart of another data transmission method according to Embodiment 1 of this application. In this embodiment, UE calculates a message authentication code of location privacy setting data, to effectively prevent the location privacy setting data from being tampered with, thereby ensuring end-to-end integrity protection of location privacy setting data between the UE and a UDM. For a part that is in FIG. 5C and FIG. 5D and that is the same as that in the embodiment shown in FIG. 5A and FIG. 5B, refer to specific descriptions in FIG. 5A and FIG. 5B. A difference between FIG. 5C and FIG. 5D and FIG. 5A and FIG. 5B lies in that, in FIG. 5A and FIG. 5B, the UDM performs authentication once, and the UE performs authentication once. In FIG. 5C and FIG. 5D, an AUSF performs authentication once, and the UE performs authentication once. The embodiment shown in FIG. 5C and FIG. 5D may include but are not limited to the following steps.

Step S101a: UE calculates a first message authentication code of first location privacy setting data.

Step S102a: If the UE is in an idle mode, a service request procedure on a UE side is triggered.

Step S103a: The UE sends the first message authentication code, a first freshness parameter, and the first location privacy setting data to an AMF by using a RAN. Correspondingly, the AMF receives the first message authentication code, the first freshness parameter, and the first location privacy setting data from the UE.

Step S104a: The AMF sends the first message authentication code, the first freshness parameter, and the first location privacy setting data to an LMF. Correspondingly, the LMF receives the first message authentication code, the first freshness parameter, and the first location privacy setting data from the AMF.

Step S105a: The LMF sends the first message authentication code, the first freshness parameter, and the first location privacy setting data to a V-GMLC. Correspondingly, the V-GMLC receives the first message authentication code, the first freshness parameter, and the first location privacy setting data from the LMF.

Step S106a: The V-GMLC sends the first message authentication code, the first freshness parameter, and the first location privacy setting data to an H-GMLC. Correspondingly, the H-GMLC receives the first message authentication code, the first freshness parameter, and the first location privacy setting data from the V-GMLC.

Step S107a: The H-GMLC sends the first message authentication code, the first freshness parameter, and the first location privacy setting data to an AUSF. Correspondingly, the AUSF receives the first message authentication code, the first freshness parameter, and the first location privacy setting data from the H-GMLC.

Step S108a: The AUSF calculates a second message authentication code and a third message authentication code of the first location privacy setting data.

The AUSF may calculate the second message authentication code of the first location privacy setting data based on an input key Kausf and a first input parameter. The second message authentication code may be represented as PS-MAC-Iue' or MACue'.

The AUSF may calculate the third message authentication code of location privacy setting data based on the input key Kausf and a second input parameter. The second input parameter may include a second freshness parameter and the first location privacy setting data, and the second freshness parameter includes a first counter value and/or a second FC value. A specific value of the second FC value is fixed, but the second FC value is different from the first FC value. The third message authentication code may be represented as PS-MAC-Iausf or MACausf.

After obtaining the second message authentication code, the AUSF determines whether the first message authentication code is the same as the second message authentication code. If the first message authentication code is the same as the second message authentication code, it indicates that the first location privacy setting data reported by the UE to a UDM is not maliciously modified by a visited network or a GMLC, and the AUSF stores and updates the location privacy setting data of the UE, that is, the received first location privacy setting data is stored as latest location privacy setting data of the UE. If the first message authentication code is different from the second message authentication code, it indicates that the first location privacy setting data reported by the UE to a UDM is maliciously modified by a visited network or a GMLC.

When determining that the first message check code is the same as the second message check code, the AUSF performs step S109a.

Step S109a: The AUSF sends the first location privacy setting data to the UDM. Correspondingly, the UDM receives and stores the first location privacy setting data from the AUSF.

The AUSF may send the first location privacy setting data to the UDM by using one message, and the message may be, for example, a Nausf_protection request.

Step S110a: The UDM sends a response message to the AUSF. Correspondingly, the AUSF receives the response message from the UDM.

The response message may be, for example, a Nausf_protection response.

Step S111a: The AUSF sends the third message authentication code to the H-GMLC. Correspondingly, the H-GMLC receives the third message authentication code from the AUSF.

Step S112a: The H-GMLC sends the third message authentication code to the V-GMLC. Correspondingly, the V-GMLC receives the third message authentication code from the H-GMLC.

Step S113a: The V-GMLC sends the third message authentication code to the LMF. Correspondingly, the LMF receives the third message authentication code from the V-GMLC.

Step S114a: The LMF sends the third message authentication code to the AMF. Correspondingly, the AMF receives the third message authentication code from the LMF.

Step S115a: The AMF sends the third message authentication code to the UE. Correspondingly, the UE receives the third message authentication code from the LMF.

Step S116a: The UE calculates a fourth message authentication code of the first location privacy setting data, and determines whether the third message authentication code is the same as the fourth message authentication code.

In Embodiment 1 shown in FIG. 5C and FIG. 5D, the UE calculates the first message authentication code of the first location privacy setting data, the AUSF calculates the second message authentication code and the third message authentication code of the first location privacy setting data, and the AUSF determines whether the first message authentication code is the same as the second message authentication code, and sends the first location privacy setting data to the UDM when the first message authentication code is the same as the second message authentication code. When receiving the third message authentication code, the UE calculates the fourth message authentication code, and determines whether the third message authentication code is the same as the fourth message authentication code. Two authentication processes can effectively prevent the location privacy setting data from being tampered with, thereby ensuring end-to-end integrity protection of the location privacy setting data between the UE and the UDM.

Figure 6A:
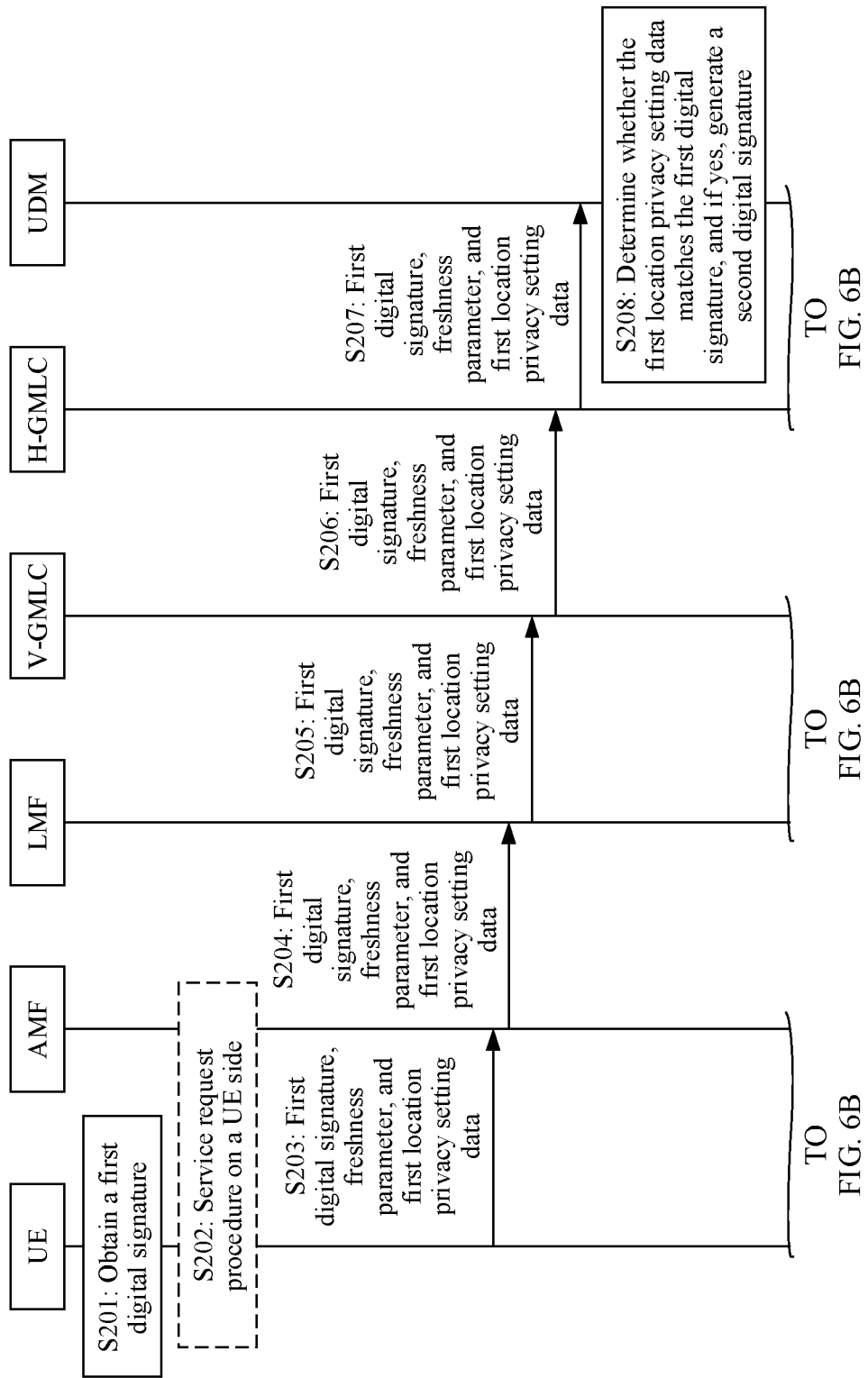
FIG. 6A and FIG. 6B are a schematic flowchart of a data transmission method according to an embodiment of this application.
Figure 6B:
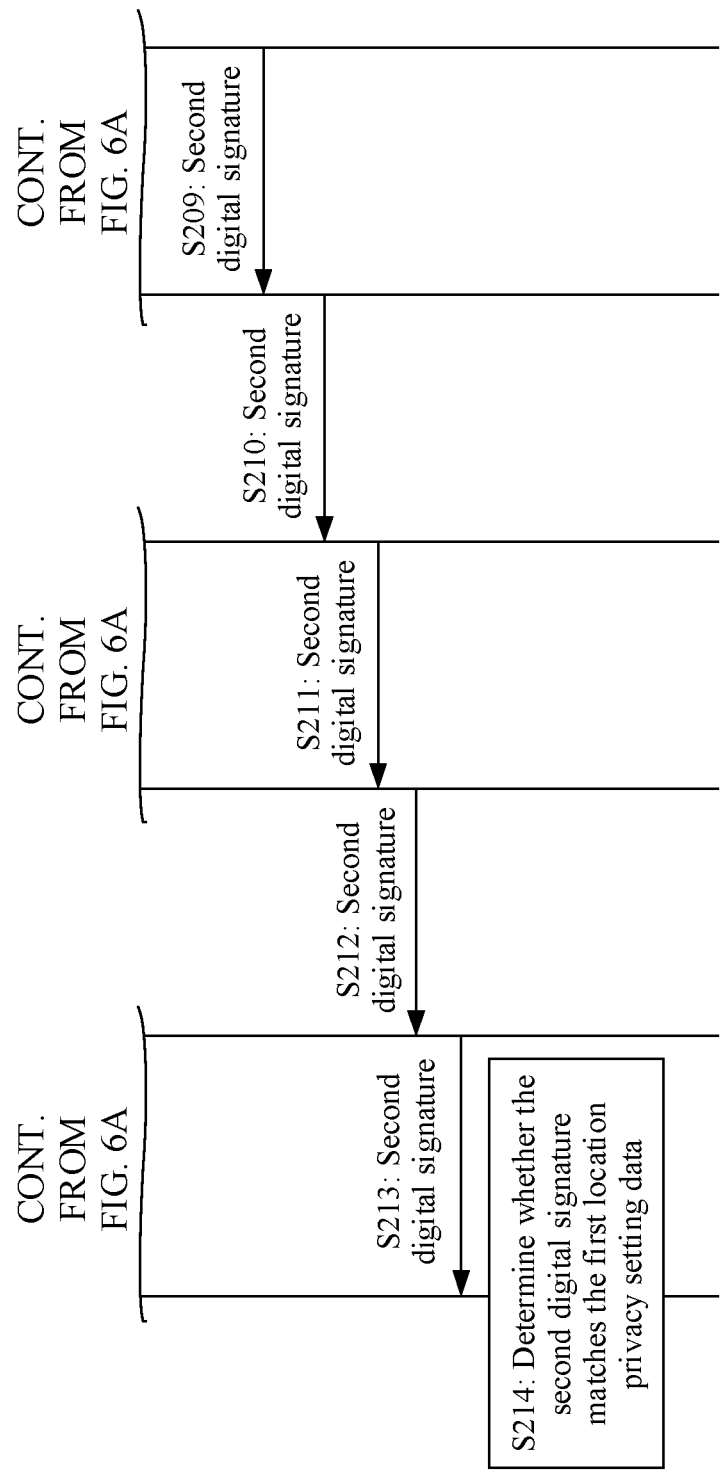

An example in which this embodiment of this application is applied to the schematic diagram of the network architecture shown in FIG. 4 is used. FIG. 6A and FIG. 6B are a schematic flowchart of a data transmission method according to Embodiment 1 of this application. In this embodiment, UE performs digital signing on location privacy setting data, to effectively prevent the location privacy setting data from being tampered with, thereby ensuring end-to-end integrity protection of location privacy setting data between the UE and a UDM. The embodiment shown in FIG. 6A and FIG. 6B may include but are not limited to the following steps.

Step S201: UE performs digital signing on first location privacy setting data, to obtain a first digital signature.

The first location privacy setting data is first location privacy setting data entered or updated by a user on the UE, and is first location privacy setting data before digital signing processing is performed. The first digital signature is obtained by performing digital signing by the UE on the first location privacy setting data.

The UE may perform digital signing on the first location privacy setting data based on a private key of the UE and an input parameter, to obtain the first digital signature. The input parameter may include a freshness parameter, and the freshness parameter may include a counter value and a function counter (FC) value. A specific value of the counter value is maintained by the UE, and a specific value of the FC value is fixed. In other words, the UE may perform digital signing on the first location privacy setting data based on the private key of the UE and the counter value.

Step S202: If the UE is in an idle mode, a service request procedure on a UE side is triggered.

If the UE is in the idle mode, it indicates that the UE does not access a core network by using a RAN, and the service request procedure on the UE side is triggered, to trigger the UE to access the core network by using the RAN, and establish a communication connection between the UE and the core network.

If the UE is in a connected mode, step S202 may not be performed.

Step S203: The UE sends the first digital signature, the freshness parameter, and the first location privacy setting data to an AMF by using the RAN. Correspondingly, the AMF receives the first digital signature, the freshness parameter, and the first location privacy setting data from the UE.

When sending the first digital signature, the freshness parameter, and the first location privacy setting data to the AMF, the UE may add the first digital signature, the freshness parameter, and the first location privacy setting data to one message, and the message may be, for example, a NAS transport message.

Step S204: The AMF sends the first digital signature, the freshness parameter, and the first location privacy setting data to an LMF. Correspondingly, the LMF receives the first digital signature, the freshness parameter, and the first location privacy setting data from the AMF.

When sending the first digital signature, the freshness parameter, and the first location privacy setting data to the LMF, the AMF may add the first digital signature, the freshness parameter, and the first location privacy setting data to one message, and the message may be, for example, a Namf_Communication_N2 message notify.

Step S205: The LMF sends the first digital signature, the freshness parameter, and the first location privacy setting data to a V-GMLC. Correspondingly, the V-GMLC receives the first digital signature, the freshness parameter, and the first location privacy setting data from the LMF.

When sending the first digital signature, the freshness parameter, and the first location privacy setting data to the V-GMLC, the LMF may add the first digital signature, the freshness parameter, and the first location privacy setting data to one message, and the message may be, for example, a Ngmlc_UserPrivacy_Set request.

Step S206: The V-GMLC sends the first digital signature, the freshness parameter, and the first location privacy setting data to an H-GMLC. Correspondingly, the H-GMLC receives the first digital signature, the freshness parameter, and the first location privacy setting data from the V-GMLC.

When sending the first digital signature, the freshness parameter, and the first location privacy setting data to the H-GMLC, the V-GMLC may add the first digital signature, the freshness parameter, and the first location privacy setting data to one message, and the message may be, for example, a Ngmlc_UserPrivacy_Set request.

Step S207: The H-GMLC sends the first digital signature, the freshness parameter, and the first location privacy setting data to a UDM. Correspondingly, the UDM receives the first digital signature, the freshness parameter, and the first location privacy setting data from the H-GMLC.

When sending the first digital signature, the freshness parameter, and the first location privacy setting data to the UDM, the H-GMLC may add the first digital signature, the freshness parameter, and the first location privacy setting data to one message, and the message may be, for example, a Nudm_UECM_Update request.

It may be understood that step S203 to step S207 are a process in which the UE reports the first digital signature, the freshness parameter, and the first location privacy setting data to the UDM by using the RAN, the AMF, the LMF, the V-GMLC, and the H-GMLC.

In a possible implementation, the UE reports the first digital signature and the freshness parameter to the UDM by using the RAN and the AMF. In this case, a related core network element includes the AMF, and the reporting process is UE→AMF→UDM. In another possible implementation, the UE reports the first digital signature and the freshness parameter to the UDM by using the RAN, the AMF, and the LMF. In this case, related core network elements include the AMF and the LMF, and the reporting process is UE→AMF→LMF→UDM.

In a non-roaming scenario, the LMF may send the first digital signature, the freshness parameter, and the first location privacy setting data to a GMLC, and then the GMLC sends the first digital signature, the first freshness parameter, and the first location privacy setting data to the UDM. In a non-roaming scenario, a process in which the UE reports the first digital signature, the freshness parameter, and the first location privacy setting data to the UDM may be: UE→AMF→UDM, UE→AMF→LMF→UDM or UE→AMF→LMF→GMLC→UDM.

The freshness parameter includes the counter value and the FC value. Because the FC value is fixed, the network element in the core network may learn that the freshness parameter transmitted in step S203 to step S207 may be the counter value.

Step S208: The UDM determines whether the first location privacy setting data matches the first digital signature, and if the first location privacy setting data matches the first digital signature, performs data signing on the first location privacy setting data, to obtain a second digital signature.

Because the UE performs digital signing on the first location privacy setting data based on the private key of the UE and the input parameter, the UDM determines, based on the public key of the UE and the input parameter, whether the first location privacy setting data matches the first digital signature. The public key of the UE may be obtained in a registration process of the UE, and is stored in the UDM. The input parameter includes a freshness parameter, and the freshness parameter may include a counter value and an FC value. Because the UE reports the counter value to the UDM, the UDM may determine, based on a public key of the UE and the counter value, whether the first location privacy setting data matches the first digital signature.

The UDM determines whether the first location privacy setting data matches the first digital signature, that is, de-signs the first digital signature by using the public key of the UE and the freshness parameter. If first location privacy setting data obtained through de-signing is the same as the first location privacy setting data, the first location privacy setting data matches the first digital signature. If authentication succeeds, it indicates that the first location privacy setting data reported by the UE to the UDM is not maliciously modified by a visited network or the GMLC. If the first location privacy setting data does not match the first digital signature, it indicates that the first location privacy setting data reported by the UE to the UDM is maliciously modified by a visited network or the GMLC.

When the first location privacy setting data matches the first digital signature, the UDM stores and updates the first location privacy setting data of the UE, that is, stores the first location privacy setting data as latest first location privacy setting data of the UE.

When the first location privacy setting data matches the first digital signature, the UDM performs data signing on the first location privacy setting data, to obtain the second digital signature. Further, the UDM may perform digital signing on the first location privacy setting data based on the private key of the UDM and the input parameter, to obtain the second digital signature. Similarly, the input parameter includes a freshness parameter, and the freshness parameter may include a counter value and an FC value. A counter value used by the UDM to perform digital signing is the counter value reported by the UE to the UDM.

Step S209: The UDM sends the second digital signature to the H-GMLC. Correspondingly, the H-GMLC receives the second digital signature from the UDM.

The UDM may send the second digital signature to the H-GMLC by using one message, and the message may be, for example, a Nudm_UECM_Update response.

Step S210: The H-GMLC sends the second digital signature to the V-GMLC. Correspondingly, the V-GMLC receives the second digital signature from the H-GMLC.

The H-GMLC may send the second digital signature to the V-GMLC by using one message, and the message may be, for example, a Ngmlc_UserPrivacy_Set response.

Step S211: The V-GMLC sends the second digital signature to the LMF. Correspondingly, the LMF receives the second digital signature from the V-GMLC.

The V-GMLC may send the second digital signature to the LMF by using one message, and the message may be, for example, a Ngmlc_UserPrivacy_Set response.

Step S212: The LMF sends the second digital signature to the AMF. Correspondingly, the AMF receives the second digital signature from the LMF.

The LMF may send the second digital signature to the AMF by using one message, and the message may be, for example, a Namf_Communication_N2 message notify.

Step S213: The AMF sends the second digital signature to the UE. Correspondingly, the UE receives the second digital signature from the LMF.

The AMF sends the second digital signature to the UE by using the RAN. The AMF may send the second digital signature to the UE by using one message, and the message may be, for example, a NAS transport message.

It may be understood that step S209 to step S213 are a process in which the UDM delivers the second digital signature to the UE, and the process is UDM→H-GMLC→V-GMLC→LMF→AMF→UE. In a possible implementation, the UDM delivers the second digital signature to the UE by using the RAN and the AMF, and the delivery process is UDM→AMF→UE. In another possible implementation, the UDM delivers the second digital signature to the UE by using the RAN, the AMF, and the LMF, and the delivery process is UDM→LMF→AMF→UE.

In a non-roaming scenario, the UDM may send the second digital signature to the GMLC, and then the GMLC sends the second digital signature to the LMF. In a non-roaming scenario, a process in which the UDM delivers the second digital signature to the UE may be: UDM→GMLC→LMF→AMF→UE, UDM→GMLC→LMF→AMF→UE→AMF→UE, or UDM→LMF→AMF→UE.

Step S214: The UE determines whether the second digital signature matches the first location privacy setting data.

The UE determines, based on the public key of the UDM and the freshness parameter, whether the second digital signature matches the first location privacy setting data, that is, de-signs the second digital signature by using the public key of the UDM and the freshness parameter. If the location privacy setting data obtained through de-signing is the same as the first location privacy setting data, the second digital signature matches the first location privacy setting data, and the first location privacy setting data stored in the UDM is not maliciously modified by the visited network or the GMLC. If the second digital signature does not match the first location privacy setting data, it indicates that the first location privacy setting data stored in the UDM is maliciously modified by the visited network or the GMLC.

The UE may obtain the public key of the UDM by using a broadcast message or in another manner.

In Embodiment 2 shown in FIG. 6A and FIG. 6B, the UE performs digital signing on the location privacy setting data. When receiving the location privacy setting data obtained through digital signing, the UDM verifies the location privacy setting data, and determines whether the location privacy setting data is maliciously modified by the visited network or the GMLC. When authentication succeeds, the UDM performs digital signing on the location privacy setting data, and delivers the location privacy setting data obtained through digital signing to the UE. The UE verifies the location privacy setting data. Two authentication processes can effectively prevent the location privacy setting data from being tampered with, thereby ensuring end-to-end integrity protection of the location privacy setting data between the UE and the UDM.

Figure 7A:
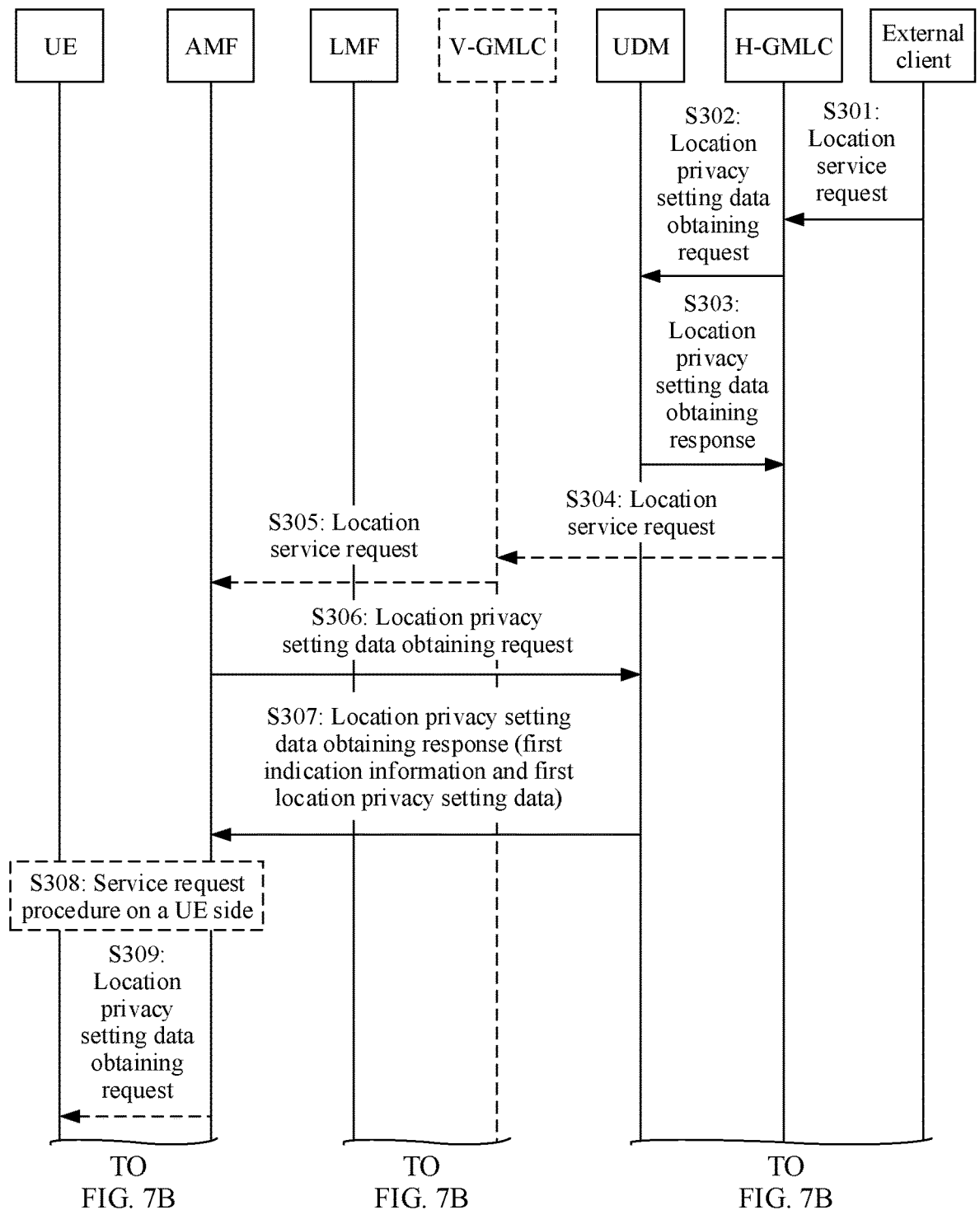
FIG. 7A and FIG. 7B are a schematic flowchart of a data transmission method according to an embodiment of this application.
Figure 7B:
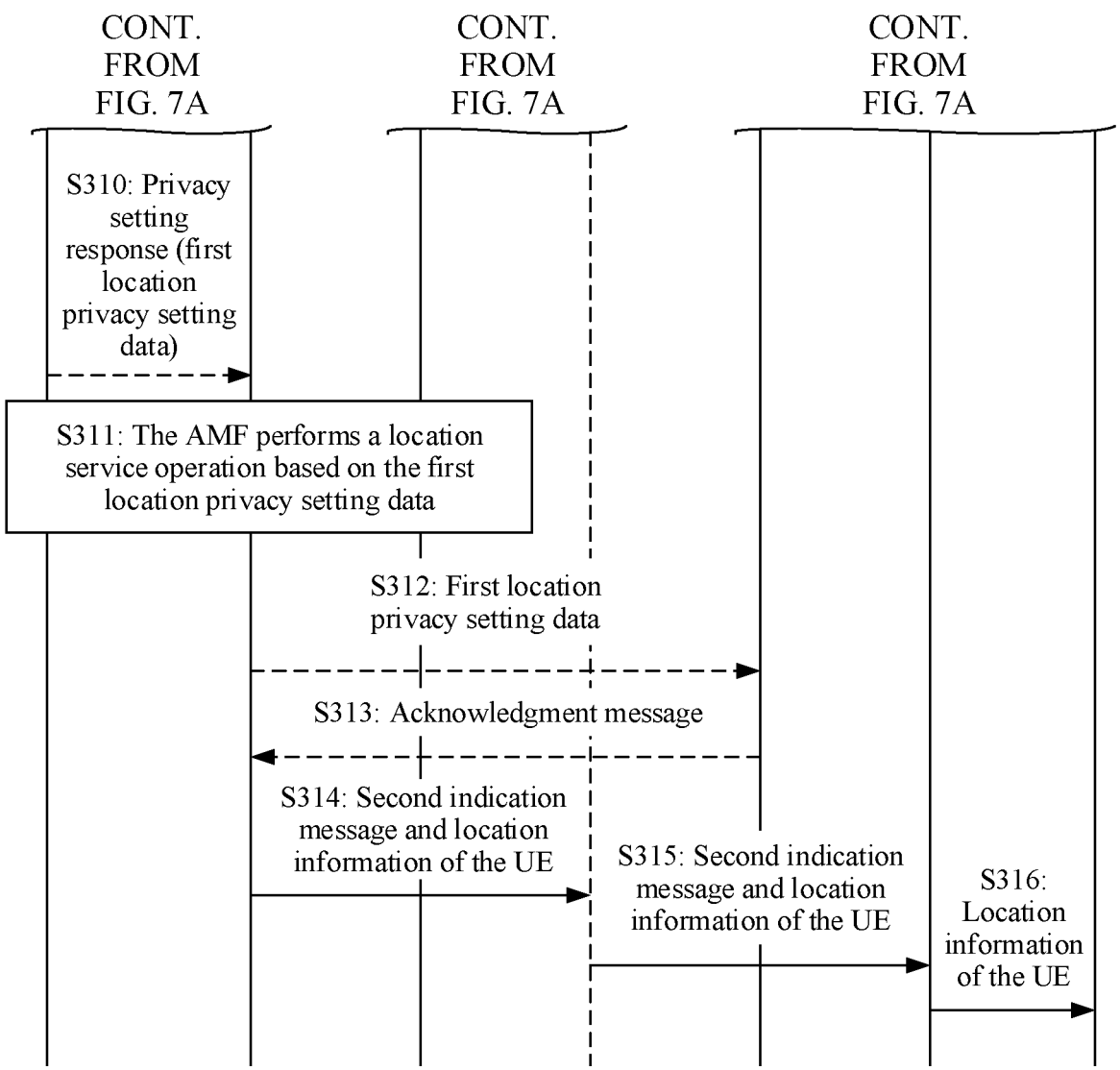

An example in which this embodiment of this application is applied to the schematic diagram of the network architecture shown in FIG. 4 is used. FIG. 7A and FIG. 7B are a schematic flowchart of a data transmission method according to Embodiment 3 of this application. In this embodiment, an AMF is used to check whether action indication information delivered by a visited network or a GMLC to the AMF is tampered with, to effectively prevent the visited network or the GMLC from delivering incorrect action indication information, thereby effectively protecting location information of UE. The embodiment shown in FIG. 7A and FIG. 7B may include but are not limited to the following steps.

Step S301: An external client sends a location service request to an H-GMLC, where the location service request may be an LCS service request. Correspondingly, the H-GMLC receives the location service request from the external client.

The location service request may carry an identifier of the UE, and the identifier is used to indicate that location information of which UE is expected to be obtained by the external client.

Step S302: The H-GMLC sends a location privacy setting data obtaining request to a UDM, where the location privacy setting data obtaining request is used to request to obtain location privacy setting data of the UE. The location privacy setting data obtaining request may be, for example, a Nudm_UECM_Get_request. Correspondingly, the UDM receives the location privacy setting data obtaining request from the H-GMLC.

The location privacy setting data obtaining request may carry the identifier of the UE.

Step S303: The UDM sends a location privacy setting data obtaining response to the H-GMLC, to respond to the location privacy setting data obtaining request. The location privacy setting data obtaining request may be, for example, a Nudm_UECM_Get_response. Correspondingly, the H-GMLC receives the location privacy setting data obtaining response from the UDM. The location privacy setting data obtaining response includes the location privacy setting data, of the UE, stored in the UDM.

Step S304: The H-GMLC sends the location service request to a V-GMLC, where the location service request may be, for example, an LCS service request. Correspondingly, the V-GMLC receives the location service request from the H-GMLC. When the location privacy setting data obtained by the H-GMLC is allowing positioning, the H-GMLC sends the location service request to the V-GMLC, to obtain location information of the UE.

When a GMLC obtains the location privacy setting data of the UE, if the location privacy setting data is not allowing positioning, the H-GMLC directly feeds back a location service response to the external client, and the location service response indicates that a location service is rejected. When the location privacy setting data is not disallowing positioning, the location privacy setting data may be converted into action indication information, to indicate an AMF to perform a corresponding location service operation. For an example of converting the location privacy setting data into the action indication information, refer to the description of step 3 in the embodiment shown in FIG. 3A and FIG. 3B. Details are not described herein again.

In a non-roaming scenario, the GMLC sends the location privacy setting data obtaining request to the UDM, and the UDM sends the location privacy setting data obtaining response to the GMLC, so that the GMLC obtains the location privacy setting data of the UE. Then, the GMLC directly sends the location service request to the AMF, that is, step S305 and step S306 are simplified into one step: the GMLC sends the location service request to the AMF.

Because FIG. 7A and FIG. 7B are a subsequent step of FIG. 5A and FIG. 5B, FIG. 5C and FIG. 5D, or FIG. 6A and FIG. 6B, the location privacy setting data, of the UE, stored in the UDM is the first location privacy setting data.

Step S305: The V-GMLC sends the location service request to the AMF. Correspondingly, the AMF receives the location service request from the V-GMLC. The location service request may be, for example, a Namf_Location_Provide_positioningInfo_request.

Optionally, the location service request includes action indication information, to be specific, includes action indication information obtained by converting the first location privacy setting data by the GMLC, and the action indication information is used to indicate the AMF to perform a corresponding location service operation. For example, if the first location privacy setting data is allowing positioning but requiring to notify a user, the action indication information is used to indicate the AMF to notify the user, and request to obtain the location information of the UE.

Step S306: The AMF sends the location privacy setting data obtaining request to the UDM. Correspondingly, the UDM receives the location privacy setting data obtaining request from the AMF.

The location privacy setting data obtaining request may be, for example, a privacy setting verification request, and is used to request to obtain the location privacy setting data of the UE from the UDM, that is, obtain the first location privacy setting data. The UE is UE whose location information is to be obtained by the external client.

Step S307: The UDM sends the location privacy setting data obtaining response to the AMF. Correspondingly, the AMF receives the location privacy setting data obtaining response from the UDM.

The location privacy setting data obtaining response may be, for example, a privacy setting verification response, and is used to respond to the location privacy setting data obtaining request, and carry the first location privacy setting data stored in the UDM.

If the first location privacy setting data is in the UDM, and is requested by the AMF for the first time after the first location privacy setting data is updated by the UDM, the location privacy setting data obtaining response further includes first indication information, and the first indication information is used to indicate that the first location privacy setting data is requested by the AMF for the first time after the first location privacy setting data is updated by the UDM. If the location privacy setting data obtaining response includes the first indication information, step S309 and step S310 are performed. If the location privacy setting data obtaining response does not include the first indication information, step S309 and step S310 are not performed.

Step S308: If the UE is in an idle mode, the AMF triggers a network side service request to the UE.

If the UE is in the idle mode, it indicates that no NAS signaling connection is established between the UE and the AMF. In this case, the AMF triggers a service request procedure on a UE side to establish a secure communication connection between the UE and a core network.

Step S309: The AMF sends the location privacy setting data obtaining request to the UE. Correspondingly, the UE receives the location privacy setting data obtaining request from the AMF.

The location privacy setting data obtaining request may be, for example, a privacy setting request. The location privacy setting data obtaining request may be combined with an RRC connection reconfiguration message or an N2 message in step S308.

Step S310: The UE sends the location privacy setting data obtaining response to the AMF. Correspondingly, the AMF receives the location privacy setting data obtaining response from the UE.

The location privacy setting data obtaining response may be, for example, a privacy setting response, including location privacy setting data reported by the UE. Assuming that the location privacy setting data reported by the UE is second location privacy setting data, the second location privacy setting data is current location privacy setting data of the UE. The location privacy setting data obtaining response may be combined with an RRC connection reconfiguration message or an N2 message in step S308.

Step S311: The AMF performs a location service operation based on the first location privacy setting data.

In a possible implementation, if the location service request sent by the GMLC to the AMF does not carry the action indication information or the location service request sent by the V-GMLC to the AMF does not carry the action indication information, the AMF directly performs the location service operation based on the first location privacy setting data. Further, if the first location privacy setting data is allowing positioning but requiring to notify a user, the AMF sends a notification message to the UE by using a RAN, and requests to obtain the location information of the UE. If the first location privacy setting data is allowing positioning but not requiring to notify a user, the AMF requests to obtain the location information of the UE. If the first location privacy setting data is requiring to notify a user and being authorized by the user to determine whether to allow positioning, the AMF sends a notification message to the UE by using a RAN, and requests to obtain the location information of the UE when receiving a location permission message from the UE.

In a possible implementation, if the location service request sent by the GMLC to the AMF carries the action indication information, or the location service request sent by the V-GMLC to the AMF carries the action indication information, the AMF verifies whether the action indication information matches the first location privacy setting data. If the action indication information matches the first location privacy setting data, the AMF determines that a visited network or the GMLC does not tamper with the first location privacy setting data. In this case, the AMF performs the location service operation based on the action indication information or the first location privacy setting data. If the action indication information does not match the first location privacy setting data, the AMF still performs the location service operation based on the first location privacy setting data. In this case, the AMF may determine that a visited network or the GMLC does not tamper with the first location privacy setting data, and the AMF may report an error reason that the first location privacy setting data is tampered with.

In a possible implementation, when step S308 and step S309 are performed, the AMF determines whether the second location privacy setting data is the same as the first location privacy setting data. If the second location privacy setting data is the same as the first location privacy setting data, it indicates that the current location privacy setting data of the UE is not changed and is consistent with that stored in the UDM. In this case, the AMF still performs the location service operation based on the first location privacy setting data. If the second location privacy setting data is different from the first location privacy setting data, it indicates that the UDM does not store latest location privacy setting data of the UE. In this case, the AMF performs the location service operation based on the second location privacy setting data, that is, performs the location service operation based on the latest location privacy setting data. The AMF further performs step S312 and step S313.

That the AMF requests to obtain the location information of the UE may include the following steps.

Step S3111: The AMF sends a location request to the LMF. Correspondingly, the LMF receives the location request from the AMF. The location request may be, for example, a Nlmf_Location_DetermineLocation Request.

Step S3112: Measure and calculate the location information of the UE. Refer to specific descriptions of step 8 to step 12 in the embodiment shown in FIG. 3A and FIG. 3B. Details are not described herein again.

Step S3113: The LMF delivers the location information of the UE to the AMF. Correspondingly, the AMF receives the location information of the UE from the LMF.

Step S312: The AMF sends the second location privacy setting data to the UDM. Correspondingly, the UDM receives the second location privacy setting data from the AMF.

The AMF may send the second location privacy setting data to the UDM by using the location privacy setting data update request. The location privacy setting data update request may be, for example, a privacy setting update request.

Step S313: The UDM sends an acknowledgment message to the AMF. Correspondingly, the AMF receives the acknowledgment message from the UDM.

The UDM may send the acknowledgment message to the AMF by using the location privacy setting data update response. The location privacy setting data update response may be, for example, a privacy setting update response.

Step S314: The AMF reports second indication information and the location information of the UE to the V-GMLC.

Correspondingly, the V-GMLC receives the second indication information and the location information of the UE from the AMF.

The second indication information is used to indicate whether positioning is completed.

Step S315: The V-GMLC reports the second indication information and the location information of the UE to the H-GMLC. Correspondingly, the H-GMLC receives the second indication information and the location information of the UE from the V-GMLC.

Step S316: The H-GMLC sends the location information of the UE to the external client. Correspondingly, the external client receives the location information of the UE from the H-GMLC.

If the second indication information indicates that positioning is completed, the H-GMLC sends the location information of the UE to the external client.

In a non-roaming scenario, the AMF may directly report the second indication information and the location information of the UE to the GMLC. If the second indication information indicates that positioning is completed, the GMLC sends the location information of the UE to the external client.

In Embodiment 3 shown in FIG. 7A and FIG. 7B, based on the schematic flowchart shown in FIG. 3A and FIG. 3B, the AMF verifies the location privacy setting data, to check whether the location privacy setting data delivered by the visited network or the GMLC to the AMF is tampered with, to effectively prevent the visited network or the GMLC from delivering incorrect action indication information, thereby effectively protecting the location information of the UE.

Figure 8A:
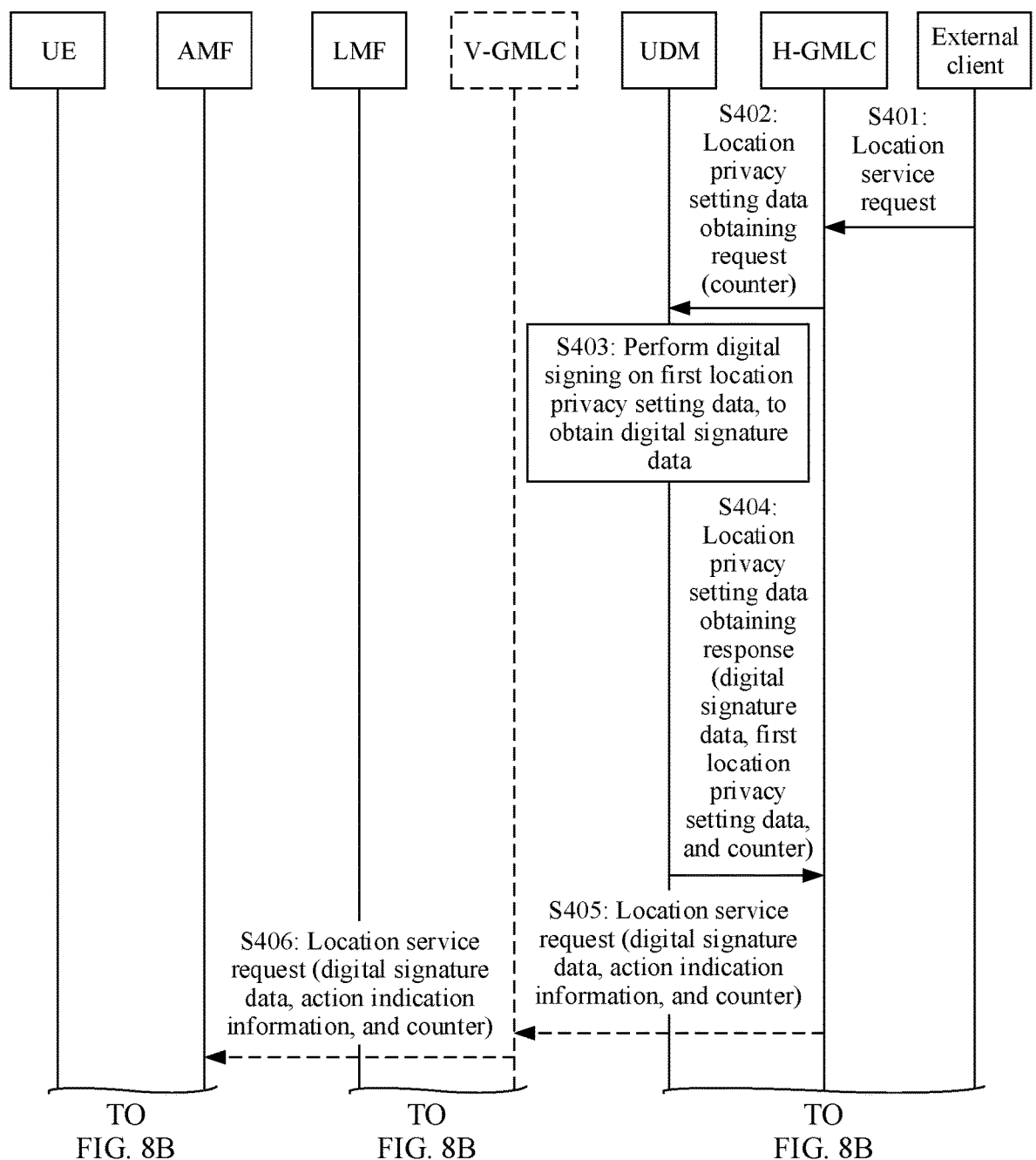
FIG. 8A and FIG. 8B are a schematic flowchart of a data transmission method according to an embodiment of this application.
Figure 8B:
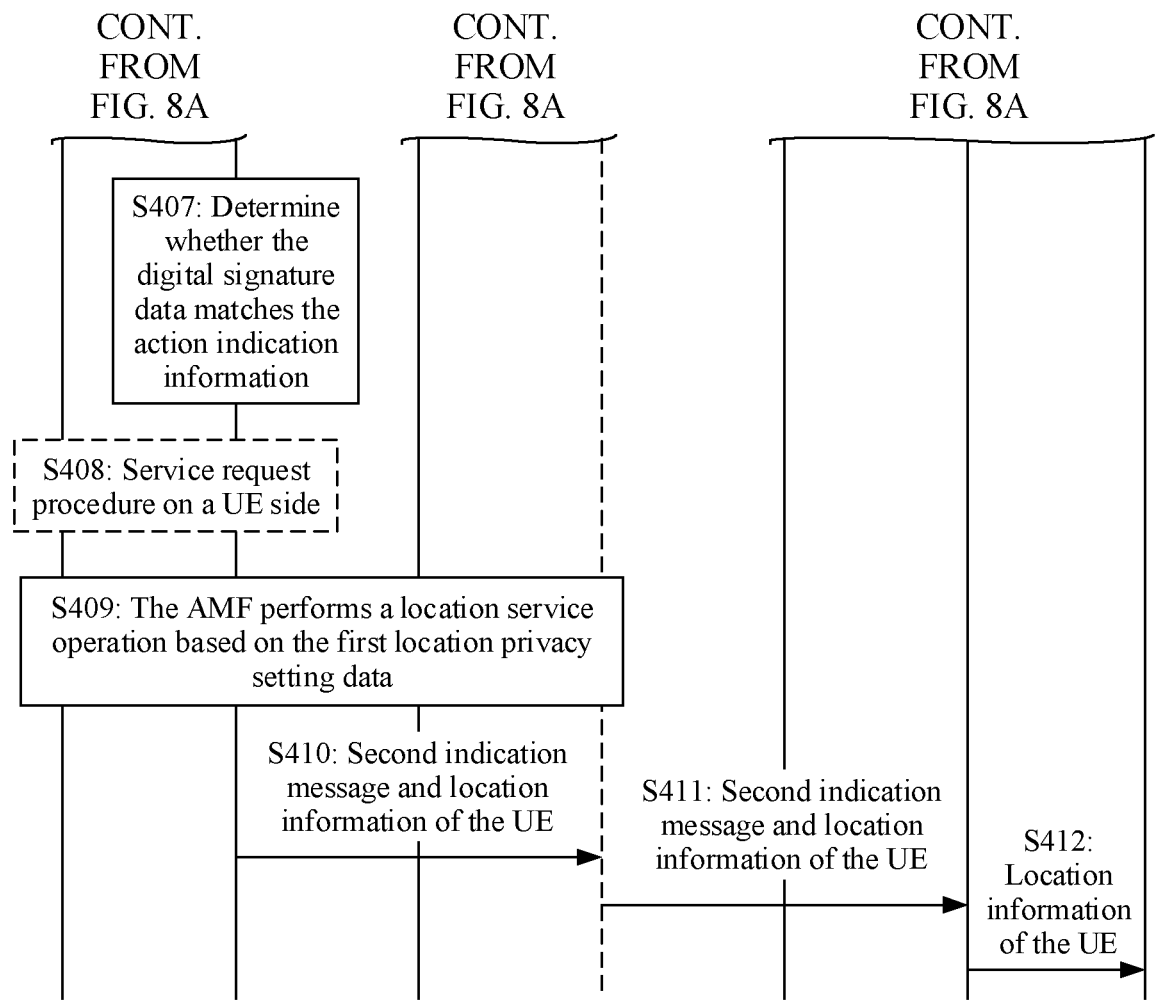

An example in which this embodiment of this application is applied to the schematic diagram of the network architecture shown in FIG. 4 is used. FIG. 8A and FIG. 8B are a schematic flowchart of a data transmission method according to Embodiment 4 of this application. In this embodiment, a UDM performs digital signing, and the UDM delivers signed location privacy setting data to an AMF, to effectively prevent a visited network or a GMLC from delivering incorrect action indication information, thereby effectively protecting location information of UE. The embodiment shown in FIG. 8A and FIG. 8B may include but are not limited to the following steps.

Step S401: An external client sends a location service request to an H-GMLC, where the location service request may be, for example, an LCS service request. Correspondingly, the H-GMLC receives the location service request from the external client.

Step S402: The H-GMLC sends a location privacy setting data obtaining request to a UDM, where the location privacy setting data obtaining request is used to request to obtain location privacy setting data, of the UE, stored by the UDM. The location privacy setting data obtaining request may be, for example, a Nudm_UECM_Get_request. Correspondingly, the UDM receives the location privacy setting data obtaining request from the H-GMLC. It is assumed that the location privacy setting data, of the UE, stored in the UDM is second location privacy setting data.

The location privacy setting data obtaining request includes a second counter value, the second counter value is maintained by the H-GMLC, and a UE side does not have the second counter value. Therefore, the second counter value is different from the first counter value in FIG. 5A and FIG. 5B, FIG. 5C and FIG. 5D, or FIG. 6A and FIG. 6B.

Step S403: The UDM performs digital signing on first location privacy setting data, to obtain digital signature data.

The UDM performs data signing on the first location privacy setting data, to obtain the digital signature data. Further, the UDM may perform digital signing on the first location privacy setting data based on a private key of the UDM and an input parameter, to obtain the digital signature data. The input parameter includes a third freshness parameter, and the third freshness parameter may include a second counter value or a third FC value. The second counter value is the second counter value carried in step S402, and the third FC value is a fixed value. The third FC value is different from the first FC value, and is different from the second FC value.

Step S404: The UDM sends a location privacy setting data obtaining response to the H-GMLC, to respond to the location privacy setting data obtaining request. The location privacy setting data obtaining request may be, for example, a Nudm_UECM_Get_response. Correspondingly, the H-GMLC receives the location privacy setting data obtaining response from the UDM.

The location privacy setting data obtaining response includes the first location privacy setting data, the digital signature data, and the second counter value.

Step S405: The H-GMLC sends the location service request to a V-GMLC, where the location service request may be, for example, an LCS service request. Correspondingly, the V-GMLC receives the location service request from the H-GMLC.

The location service request includes action indication information, the digital signature data, and the second counter value.

Step S406: The V-GMLC sends the location service request to an AMF. Correspondingly, the AMF receives the location service request from the V-GMLC. The location service request may be, for example, a Namf_Location_Provide_positioningInfo_request.

The location service request includes action indication information, the digital signature data, and the second counter value.

In non-roaming scenarios, a GMLC directly sends the location service request to the AMF. Correspondingly, the AMF receives the location service request from the GMLC. The location service request includes action indication information, the digital signature data, and the second counter value.

Step S407: The AMF determines whether the digital signature data matches the action indication information.

The AMF determines, based on a public key of the UDM and the second counter value, whether the digital signature data matches the action indication information, that is, de-signs the digital signature data by using the public key of the UDM and the second counter value. If first location privacy setting data obtained through de-signing matches a location service operation indicated by the action indication information, the digital signature data matches the action indication information, and the action indication information delivered by the GMLC is not maliciously modified. If the digital signature data does not match the action indication information, it indicates that the action indication information delivered by the GMLC is maliciously modified.

The AMF may obtain the public key of the UDM. For example, when obtaining the first location privacy setting data from the UDM, the AMF may obtain the public key of the UDM. A specific manner in which the AMF obtains the public key of the UDM is not limited in this embodiment of this application.

Step S408: If the UE is in an idle mode, the AMF triggers a network side service request to the UE.

Step S409: The AMF performs a location service operation based on the first location privacy setting data.

Regardless of whether the digital signature data matches the action indication information, the AMF performs the location service operation based on the first location privacy setting data obtained through de-signing. For a specific implementation process in which the AMF performs the location service operation based on the first location privacy setting data, refer to corresponding descriptions in step S311 in the embodiment shown in FIG. 7A and FIG. 7B. Details are not described herein again.

Step S410: The AMF reports second indication information and location information of the UE to the V-GMLC. Correspondingly, the V-GMLC receives the second indication information and the location information of the UE from the AMF.

The second indication information is used to indicate whether positioning is completed.

Step S411: The V-GMLC reports the second indication information and the location information of the UE to the H-GMLC. Correspondingly, the H-GMLC receives the second indication information and the location information of the UE from the V-GMLC.

Step S412: The H-GMLC sends the location information of the UE to the external client. Correspondingly, the external client receives the location information of the UE from the H-GMLC.

If the second indication information indicates that positioning is completed, the H-GMLC sends the location information of the UE to the external client.

In a non-roaming scenario, the AMF may directly report the second indication information and the location information of the UE to the GMLC. If the second indication information indicates that positioning is completed, the GMLC sends the location information of the UE to the external client.

In Embodiment 4 shown in FIG. 8A and FIG. 8B, based on the schematic flowchart shown in FIG. 3A and FIG. 3B, the UDM performs digital signing, and the UDM delivers signed location privacy setting data to the AMF, to effectively prevent the GMLC from delivering incorrect action indication information, thereby effectively protecting the location information of the UE.

It may be understood that Embodiment 3 shown in FIG. 7A and FIG. 7B and Embodiment 4 shown in FIG. 8A and FIG. 8B are subsequent steps of Embodiment 1 shown in FIG. 5A and FIG. 5B, FIG. 5C and FIG. 5D, and Embodiment 2 shown in FIG. 6A and FIG. 6B.

The foregoing describes in detail the method in the embodiments of this application. The following provides an apparatus in the embodiments of this application.

Figure 9:
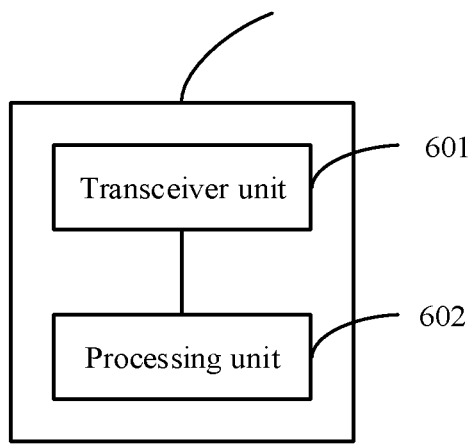
FIG. 9 is a schematic diagram of a logical structure of a communications apparatus according to an embodiment of this application.

FIG. 9 is a schematic diagram of a logical structure of a communications apparatus according to an embodiment of this application. The communications apparatus 60 may include a transceiver unit 601 and a processing unit 602. The communications apparatus 60 is a data transmission apparatus, and may be a user terminal, a data management network element, or an access management network element.

When the communications apparatus 60 is the user terminal, the processing unit 602 is configured to calculate a first message authentication code of first location privacy setting data, and the transceiver unit 601 is configured to send the first message authentication code and the first location privacy setting data to a data management network element.

When the communications apparatus 60 is the user terminal, the communications apparatus 60 may implement functions of the UE in the embodiments shown in FIG. 5A and FIG. 5B, FIG. 5C and FIG. 5D, and FIG. 6A and FIG. 6B to FIG. 8A and FIG. 8B. For a detailed process of executing the units in the communications apparatus 60, refer to the execution steps of the UE in the embodiments shown in FIG. 5A and FIG. 5B, FIG. 5C and FIG. 5D, and FIG. 6A and FIG. 6B to FIG. 8A and FIG. 8B. Details are not described herein again.

When the communications apparatus 60 is the data management network element, the data management network element further includes a storage unit 603.

The transceiver unit 601 is configured to receive a first message authentication code and first location privacy setting data that are from a user terminal, and obtain a second message authentication code of the first location privacy setting data.

The processing unit 602 is configured to, if the second message authentication code is the same as the first message authentication code, determine that the first location privacy setting data is not tampered with.

The storage unit 603 is configured to store the first location privacy setting data.

When the communications apparatus 60 is the data management network element, the communications apparatus 60 may implement functions of the UDM in the embodiments shown in FIG. 5A and FIG. 5B, FIG. 5C and FIG. 5D, and FIG. 6A and FIG. 6B to FIG. 8A and FIG. 8B. For a detailed process of executing the units in the communications apparatus 60, refer to the execution steps of the UDM in the embodiments shown in FIG. 5A and FIG. 5B, FIG. 5C and FIG. 5D, and FIG. 6A and FIG. 6B to FIG. 8A and FIG. 8B. Details are not described herein again.

When the communications apparatus 60 is the access management network element, the transceiver unit 601 is configured to send a location privacy setting data obtaining request to a data management network element when receiving a location service request from a gateway mobile location network element, and receive a location privacy setting data obtaining response from the data management network element, where the location privacy setting data obtaining response includes first location privacy setting data, and the processing unit 602 is configured to perform a location service operation based on the first location privacy setting data.

When the communications apparatus 60 is the access management network element, the communications apparatus 60 may implement functions of the AMF in the embodiments shown in FIG. 5A and FIG. 5B, FIG. 5C and FIG. 5D, and FIG. 6A and FIG. 6B to FIG. 8A and FIG. 8B. For a detailed process of executing the units in the communications apparatus 60, refer to the execution steps of the AMF in the embodiments shown in FIG. 5A and FIG. 5B, FIG. 5C and FIG. 5D, and FIG. 6A and FIG. 6B to FIG. 8A and FIG. 8B. Details are not described herein again.

Figure 10:
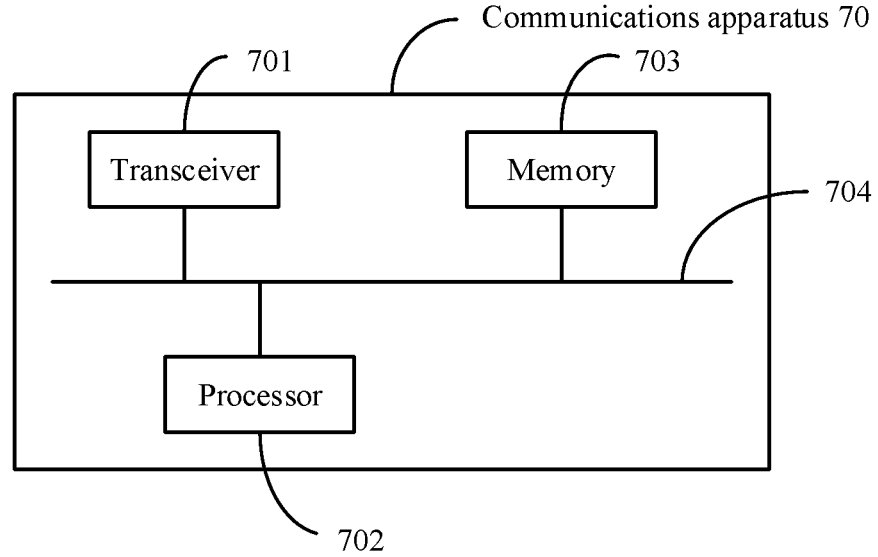
FIG. 10 is a simplified schematic diagram of a physical structure of a communications apparatus according to an embodiment of this application.

FIG. 10 is a simplified schematic diagram of a physical structure of a communications apparatus according to an embodiment of this application. The communications apparatus 70 is a data transmission apparatus, and may be a user terminal, a data management network element, or an access management network element.

The communications apparatus 70 includes a transceiver 701, a processor 702, and a memory 703. The transceiver 701, the processor 702, and the memory 703 may be connected to each other through a bus 704, or may be connected to each other in another manner. A related function implemented by the transceiver unit 601 shown in FIG. 9 may be implemented by the transceiver 701. A related function implemented by the processing unit 602 shown in FIG. 9 may be implemented by one or more processors 702.

The memory 703 includes but is not limited to a random-access memory (RAM), a read-only memory (ROM), an erasable programmable ROM (EPROM), or a portable ROM (e.g., compact disc (CD) ROM (CD-ROM)). The memory 703 is configured to store a related instruction and related data.

The transceiver 701 is configured to send data and/or signaling, and receive data and/or signaling.

If the communications apparatus 70 is the UE in the embodiments shown in FIG. 5A and FIG. 5B, FIG. 5C and FIG. 5D, and FIG. 6A and FIG. 6B to FIG. 8A and FIG. 8B, the transceiver 701 may be configured to communicate with the AMF by using the RAN, for example, perform step S103 and step S116 in the embodiment shown in FIG. 5A and FIG. 5B, perform step S102a and step S115a in the embodiment shown in FIG. 5C and FIG. 5D, perform step S203 and step S213 in the embodiment shown in FIG. 6A and FIG. 6B, and perform step S309 and step S310 in the embodiment shown in FIG. 7A and FIG. 7B.

If the communications apparatus 70 is the UDM in the embodiments shown in FIG. 5A and FIG. 5B, FIG. 5C and FIG. 5D, and FIG. 6A and FIG. 6B to FIG. 8A and FIG. 8B, the transceiver 701 may be configured to communicate with the AMF, the GMLC, and the AUSF, for example, perform step S107, step S108, and step S110 in the embodiment shown in FIG. 5A and FIG. 5B, perform step S109a and step S110a in the embodiment shown in FIG. 5C and FIG. 5D, perform step S207 and step S209 in the embodiment shown in FIG. 6A and FIG. 6B, and perform step S302, step S303, step S306, step S307, step S312, and step S313 in the embodiment shown in FIG. 7A and FIG. 7B, and perform step S402 and step S404 in the embodiment shown in FIG. 8A and FIG. 8B.

If the communications apparatus 70 is the AMF in the embodiments shown in FIG. 5A and FIG. 5B, FIG. 5C and FIG. 5D, and FIG. 6A and FIG. 6B to FIG. 8A and FIG. 8B, the transceiver 701 may be configured to communicate with the UE, the GMLC, the UDM, and the LMF, for example, perform step S103, step S104, step S115, and step S116 in the embodiment shown in FIG. 5A and FIG. 5B, perform step S103a, step S104a, step S114a, and step S115a in the embodiment shown in FIG. 5C and FIG. 5D, perform step S203, step S204, step S212, and step S213 in the embodiment shown in FIG. 6A and FIG. 6B, perform step S305, step S306, step S307, step S309, step S310, step S312, step S313, and step S314 in the embodiment shown in FIG. 7A and FIG. 7B, and perform step S406 and step S410 in the embodiment shown in FIG. 8A and FIG. 8B.

The processor 702 may include one or more processors, for example, include one or more central processing units (CPUs). When the processor 702 is one CPU, the CPU may be a single-core CPU or a multi-core CPU.

If the communications apparatus 70 is the UE in the embodiments shown in FIG. 5A and FIG. 5B, FIG. 5C and FIG. 5D, and FIG. 6A and FIG. 6B to FIG. 8A and FIG. 8B, the processor 702 may be configured to perform an operation of controlling the UE, for example, perform step S101 and step S117 in the embodiment shown in FIG. 5A and FIG. 5B, perform step S101a and step S116a in the embodiment shown in FIG. 5C and FIG. 5D, and perform step S201 and step S214 in the embodiment shown in FIG. 6A and FIG. 6B.

If the communications apparatus 70 is the UDM in the embodiments shown in FIG. 5A and FIG. 5B, FIG. 5C and FIG. 5D, and FIG. 6A and FIG. 6B to FIG. 8A and FIG. 8B, the processor 702 may be configured to perform an operation of controlling the UDM, for example, perform step S111 in the embodiment shown in FIG. 5A and FIG. 5B, perform step S208 in the embodiment shown in FIG. 6A and FIG. 6B, and perform step S403 in the embodiment shown in FIG. 8A and FIG. 8B.

If the communications apparatus 70 is the AMF in the embodiments shown in FIG. 5A and FIG. 5B, FIG. 5C and FIG. 5D, and FIG. 6A and FIG. 6B to FIG. 8A and FIG. 8B, the processor 702 may be configured to perform an operation of controlling the AMF, for example, perform step S311 in the embodiment shown in FIG. 7A and FIG. 7B, and perform step S407 and step S409 in the embodiment shown in FIG. 8A and FIG. 8B.

The memory 703 is configured to store program code and data of the communications apparatus 70. When the communications apparatus 70 is the UDM in the embodiments shown in FIG. 5A and FIG. 5B, FIG. 5C and FIG. 5D, and FIG. 6A and FIG. 6B to FIG. 8A and FIG. 8B, the memory 703 is configured to store the location privacy setting data reported by the UE.

For specific steps performed by the processor 702 and the transceiver 701, refer to the descriptions of the embodiments shown in FIG. 5A and FIG. 5B, FIG. 5C and FIG. 5D, and FIG. 6A and FIG. 6B to FIG. 8A and FIG. 8B. Details are not described herein again.

It may be understood that FIG. 10 shows only a simplified design of the communications apparatus. In actual application, the communication apparatus may further include other necessary components which include but are not limited to any quantity of transceivers, processors, controllers, memories, communication units, and the like. All devices capable of implementing this application fall within the protection scope of this application.

An embodiment of this application further provides a data transmission system, including a user terminal, a data management network element, an access management network element, and a gateway mobile location network element. The user terminal is configured to implement functions of the UE in FIG. 5A and FIG. 5B, FIG. 5C and FIG. 5D, and FIG. 6A and FIG. 6B to FIG. 8A and FIG. 8B. The data management network element is configured to implement functions of the UDM in FIG. 5A and FIG. 5B, FIG. 5C and FIG. 5D, and FIG. 6A and FIG. 6B to FIG. 8A and FIG. 8B. The access management network element is configured to implement functions of the AMF in FIG. 5A and FIG. 5B, FIG. 5C and FIG. 5D, and FIG. 6A and FIG. 6B to FIG. 8A and FIG. 8B. The gateway mobile location network element is configured to implement functions of the V-GMLC and the H-GMLC in FIG. 5A and FIG. 5B, FIG. 5C and FIG. 5D, and FIG. 6A and FIG. 6B to FIG. 8A and FIG. 8B. The data transmission system further includes an authentication service network element, configured to implement functions of the AUSF in FIG. 5A and FIG. 5B, FIG. 5C and FIG. 5D, and FIG. 6A and FIG. 6B to FIG. 8A and FIG. 8B.

A person of ordinary skill in the art may understand that all or some of the processes of the methods in the embodiments may be implemented by a computer program instructing related hardware. The program may be stored in a computer-readable storage medium. When the program runs, the processes of the methods in the embodiments are performed. The foregoing storage medium includes any medium that can store program code, such as a ROM, a RAM, a magnetic disk, or an optical disc. Therefore, another embodiment of this application provides a computer-readable storage medium. The computer-readable storage medium stores instructions, and when the instructions are run on a computer, the computer is enabled to perform the methods in the foregoing aspects.

Another embodiment of this application further provides a computer program product including instructions. When the computer program product runs on a computer, the computer is enabled to perform the methods in the foregoing aspects.

A person of ordinary skill in the art may be aware that, in combination with the examples described in the embodiments disclosed in this application, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a dedicated computer, a computer network, or other programmable apparatuses. The computer instruction may be stored in a computer-readable storage medium, or may be transmitted by using the computer-readable storage medium. The computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state drive (solid state disk, SSD)), or the like.

What is claimed is:

1. A method implemented by an apparatus, wherein the method comprises:
    calculating a first message authentication code of first location privacy setting data, wherein the first location privacy setting data are based on an entry or an update by a user of the apparatus;
    sending, to a data management network element, the first message authentication code and the first location privacy setting data;
    receiving, from the data management network element, a second message authentication code;
    calculating a third message authentication code of the first location privacy setting data; and
    determining that the first location privacy setting data is not tampered with when the second message authentication code is the same as the third message authentication code.

2. The method of claim 1, wherein calculating the first message authentication code comprises calculating, based on a first freshness parameter, the first message authentication code, and wherein the first freshness parameter comprises a first counter value.

3. The method of claim 2, further comprising sending, to the data management network element, the first freshness parameter.

4. The method of claim 1, wherein calculating the first message authentication code comprises calculating, based on a first freshness parameter, the first message authentication code, and wherein the first freshness parameter comprises a first function counter value.

5. The method of claim 4, further comprising sending, to the data management network element, the first freshness parameter.

6. A method implemented by a data management network element, wherein the method comprises:
    receiving, from an apparatus, a first message authentication code and first location privacy setting data, wherein the first location privacy setting data are based on an entry or an update by a user of the apparatus;
    sending, to an authentication server function network element, the first location privacy setting data;
    receiving a second message authentication code; and
    when the second message authentication code is the same as the first message authentication code:
        determining that the first location privacy setting data is not tampered with; and
        storing the first location privacy setting data.

7. The method of claim 6, further comprising:
    obtaining a third message authentication code of the first location privacy setting data; and sending, to the apparatus, the third message authentication code.

8. The method of claim 6, further comprising updating stored location privacy setting data of the apparatus from the first location privacy setting data to second location privacy setting data when the data management network element receives the second location privacy setting data from an access management network element.

9. The method of claim 8, further comprising receiving, from a gateway mobile location network element, a location privacy setting data obtaining request comprising a freshness parameter, wherein the freshness parameter comprises a counter value and a function counter value.

10. The method of claim 9, further comprising:
performing, based on the freshness parameter, digital signing on the first location privacy setting data to obtain digital signature data; and
sending, to the gateway mobile location network element, a location privacy setting data obtaining response comprising the first location privacy setting data, the digital signature data, and the freshness parameter.

11. A method implemented by an access management network element, wherein the method comprises:
sending, to a data management network element, a location privacy setting data obtaining request responsive to receiving a location service request from a gateway mobile location network element;
receiving, from the data management network element in response to the location privacy setting data obtaining request, a location privacy setting data obtaining response comprising first location privacy setting data and first indication information, wherein the first location privacy setting data are based on an entry or an update by a user of an apparatus, and wherein the first indication information indicates that the first location privacy setting data is requested by the access management network element for a first time;
obtaining, from the apparatus based on the first indication information, second location privacy setting data that are current location privacy setting data of the apparatus; and
performing, based on the first location privacy setting data, a first location service operation when the second location privacy setting data is the same as the first location privacy setting data.

12. The method of claim 11, wherein when the first location privacy setting data allows positioning and requires to notify the user, performing the first location service operation comprises:
sending, to the apparatus, a notification message; and
requesting to obtain location information of the apparatus.

13. The method of claim 11, wherein when the first location privacy setting data allows positioning and does not require to notify the user, performing the first location service operation comprises requesting to obtain location information of the apparatus.

14. The method of claim 11, wherein when the first location privacy setting data requires to notify the user and be authorized by the user to determine whether to allow positioning, performing the first location service operation comprises:
sending, to the apparatus, a notification message;
receiving a location permission message from the apparatus; and
requesting to obtain location information of the apparatus responsive to receiving the location permission message.

15. The method of claim 11, wherein when the second location privacy setting data is different from the first location privacy setting data, the method further comprises:
performing, based on the second location privacy setting data, a second location service operation; and
sending the second location privacy setting data to the data management network element.

16. An apparatus comprising:
a memory configured to store program instructions; and
one or more processors coupled to the memory and configured to execute the program instructions to cause the apparatus to:
calculate a first message authentication code of first location privacy setting data, wherein the first location privacy setting data are based on an entry or an update by a user of the apparatus;
send the first message authentication code and the first location privacy setting data to a data management network element;
receive a second message authentication code from the data management network element;
calculate a third message authentication code of the first location privacy setting data; and
determine that the first location privacy setting data is not tampered with when the second message authentication code is the same as the third message authentication code.

17. The apparatus of claim 16, wherein the one or more processors are further configured to execute the program instructions to cause the apparatus to calculate, based on a first freshness parameter, the first message authentication code, and wherein the first freshness parameter comprises a first counter value.

18. The apparatus of claim 17, wherein the one or more processors are further configured to execute the program instructions to cause the apparatus to send the first freshness parameter to the data management network element.

19. The apparatus of claim 16, wherein the one or more processors are further configured to execute the program instructions to cause the apparatus to calculate, based on a first freshness parameter, the first message authentication code, wherein the first freshness parameter comprises a first function counter value.

20. The apparatus of claim 19, wherein the one or more processors are further configured to execute the program instructions to cause the apparatus to send the first freshness parameter to the data management network element.

* * * * *